April 12, 1966 J. A. ARNOLD ETAL 3,246,240

SYSTEM AND METHOD FOR ELECTRICAL ANALYSIS OF NETWORK INTERCONNECTIONS

Filed May 9, 1962 14 Sheets-Sheet 1

INVENTORS
JOHN A. ARNOLD
DAVID GORDON
MYRON M. KUTCHER
BY
ATTORNEY

April 12, 1966 J. A. ARNOLD ETAL 3,246,240
SYSTEM AND METHOD FOR ELECTRICAL ANALYSIS OF NETWORK INTERCONNECTIONS
Filed May 9, 1962 14 Sheets-Sheet 2

April 12, 1966 J. A. ARNOLD ETAL 3,246,240

SYSTEM AND METHOD FOR ELECTRICAL ANALYSIS OF NETWORK INTERCONNECTIONS

Filed May 9, 1962 14 Sheets-Sheet 3

April 12, 1966 J. A. ARNOLD ETAL 3,246,240

SYSTEM AND METHOD FOR ELECTRICAL ANALYSIS OF NETWORK INTERCONNECTIONS

Filed May 9, 1962

14 Sheets-Sheet 6

COMMAND DECODER

SWITCH SIGNAL GENERATOR

April 12, 1966 J. A. ARNOLD ETAL 3,246,240

SYSTEM AND METHOD FOR ELECTRICAL ANALYSIS OF NETWORK INTERCONNECTIONS

Filed May 9, 1962 14 Sheets-Sheet 9

United States Patent Office 3,246,240
Patented Apr. 12, 1966

3,246,240

SYSTEM AND METHOD FOR ELECTRICAL ANALYSIS OF NETWORK INTERCONNECTIONS

John A. Arnold, Vestal, David Gordon, Hurley, and Myron M. Kutcher, Woodstock, N.Y., assignors to International Business Machines Corporation, New York, N.Y., a corporation of New York Filed May 9, 1962, Ser. No. 193,398
9 Claims. (Cl. 324—73)

The present system is useful for checking the sufficiency of connections within electrical apparatus and is particularly useful where checking operations are to be carried out within complex apparatus having a multiplicity of electrical networks and where accurate test for the sufficiency of each network is required.

Electrical apparatus may have a plurality of points to be connected in accordance with a predetermined plan. The points within each of certain groups interconnected during the connection process form corresponding groups of networks. An example of such apparatus is a multipoint terminal block wired to electrical equipment and having networks formed by wiring together various groups of terminals. To determine the sufficiency of connections established within any network during the connection process after the process has been completed, each point of such a network is examined for continuity to all other points in the same network specified by the connection plant (i.e. examined for the absences of incomplete connections or "opens") and examined for continuity to points not included in the network by the connection plan (i.e. examined for spurious connections or "shorts").

In the past, tests for opens have been performed by the repetitive serial steps of selecting each possible combination of network points taken two at a time as specified by the connection plan and then testing for continuity between the selected pair of points until all possible network connection combinations have been tested. Similarly, the test for shorts between the network and other, non-network points has been performed by the repetitive serial steps of selecting each possible combination of the network points and each non-network point and then testing for the absence of continuity, the combinations being taken two at a time until all possible combinations of network and non-network points have been examined. Any detected failure of the actual connection within the examined apparatus to correspond to the connection plan as well as the identity of the points at which failure is detected are recorded for later use.

Equipment for performing such tests usually employs a conventional continuity tester, for instance a current-sensitive detector and a battery serially connectable by probes between the pair of apparatus points currently selected. The selection of apparatus points, operation of the continuity tester, and any recording operation may be effected manually by an operator or by suitable electrical switching apparatus under manual or automatic program control. In any case, the on-line procedure of repetitively and serially carrying out (1) selecting (2) testing, and (3) recording operations for each combination of apparatus points makes the total time to test a network dependent on the sums of the multiplicity of operational steps. As a further complication, the apparatus provided in such a device adapted to semi-automatic or fully automatic operation traditionally has been electro-mechanical type (i.e., stepping switches, relays and the like) because such apparatus has a relatively low original cost and can be wired to carry out a fixed program of selecting (probing) operations with comparative ease. However, such switch gear operates at a relatively low speed and, once wired, is expensive to modify to meet the testing needs of different types of apparatus.

Therefore, it it an object of the present invention to provide a new and improved system for testing the sufficiency of connections established in electrical apparatus.

Another object of the present invention is to provide a method for testing the sufficiency of networks in electrical apparatus which is capable of operating at relatively high speed.

Another object of the present invention is to provide a new and improved, high speed testing system which is easily programmed to conduct examinations over a large number of possible connection combinations.

Another object of the present invention is to provide a new and improved high speed testing system which is adapted to be controlled by a stored program.

Another object of the present invention is to provide a new and improved testing system which is easily programmed to examine the sufficiency of any of a large number of possible connection combinations.

A feature of the present invention is characterized by the use of a multi-element memory in which is generated in parallel fashion a plurality of electrical manifestations representing an image of an existing electrical network in the apparatus under test.

Another feature of the invention is characterized by the use of the above-described memory in combination with apparatus operative after the completion of the image generation process for comparing electrical manifestations generated in accordance with the plan by which the network points have been connected against the image preserved in memory.

The present invention is a system for testing the sufficiency of connections established in electrical apparatus (for instance, a wired terminal block assembly), where the apparatus includes a number of junction points which have been electrically interrelated to each other in accordance with a connection plan. The inventive system has energizing means for selectively applying a signal to any one of the apparatus points. Consequently, the same signal also appears on all other apparatus points connected thereto. There also is provided a memory having a plurality of elements. Each apparatus point corresponds and is unique to a particular one of the memory elements and is effective to store a signal written therein. In order to generate in the memory an image of elements currently storing signals, which elements represent the apparatus points connected to the one of the points selected by the above-mentioned energizing means, there is provided means to write a signal appearing at any one of the apparatus points into the corresponding memory element. After the writing and storing operation has been completed, comparing means is effective to detect any difference between the identity of the elements included in the above described image and the identity of the memory elements corresponding to those apparatus points which, in accordance with the connection plan, are connected to the one of the apparatus points selected by the energizing means.

The foregoing and other objects, features and advantages of the invention will be apparent from the following more particular description of a preferred embodiment of the invention, as illustrated in the accompanying drawings.

FIG. 1 represents a block diagram of elements of the system in which the present invention is practiced.

FIGS. 2A–2E when arrayed in the order shown in FIG. 2F represent a schematic diagram of equipment included in the system. FIG. 2A shows a source of data and instruction words, while FIGS. 2B–2E show a tester capable of using such data and instruction words.

Figure 12A:
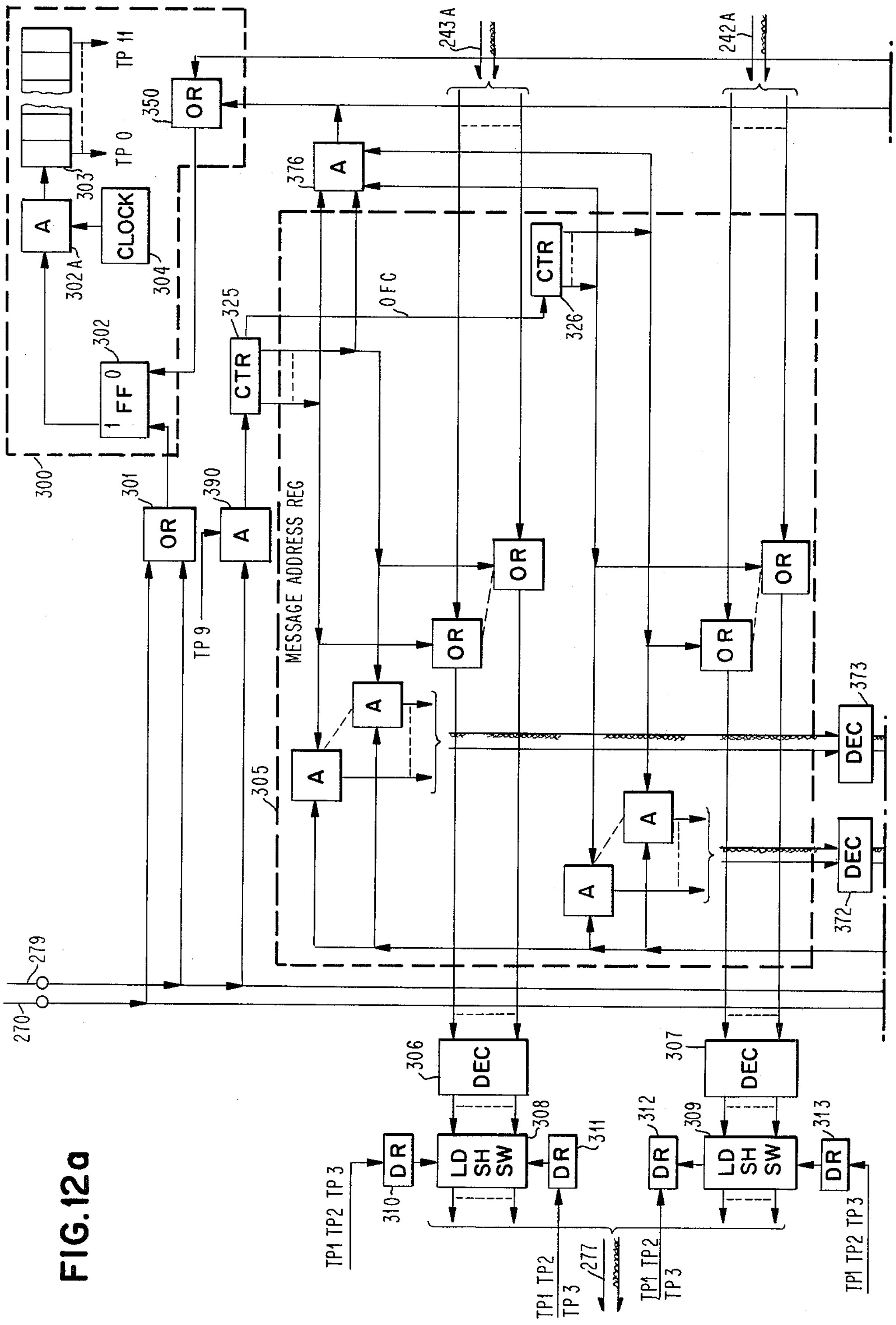
Figure 12B:
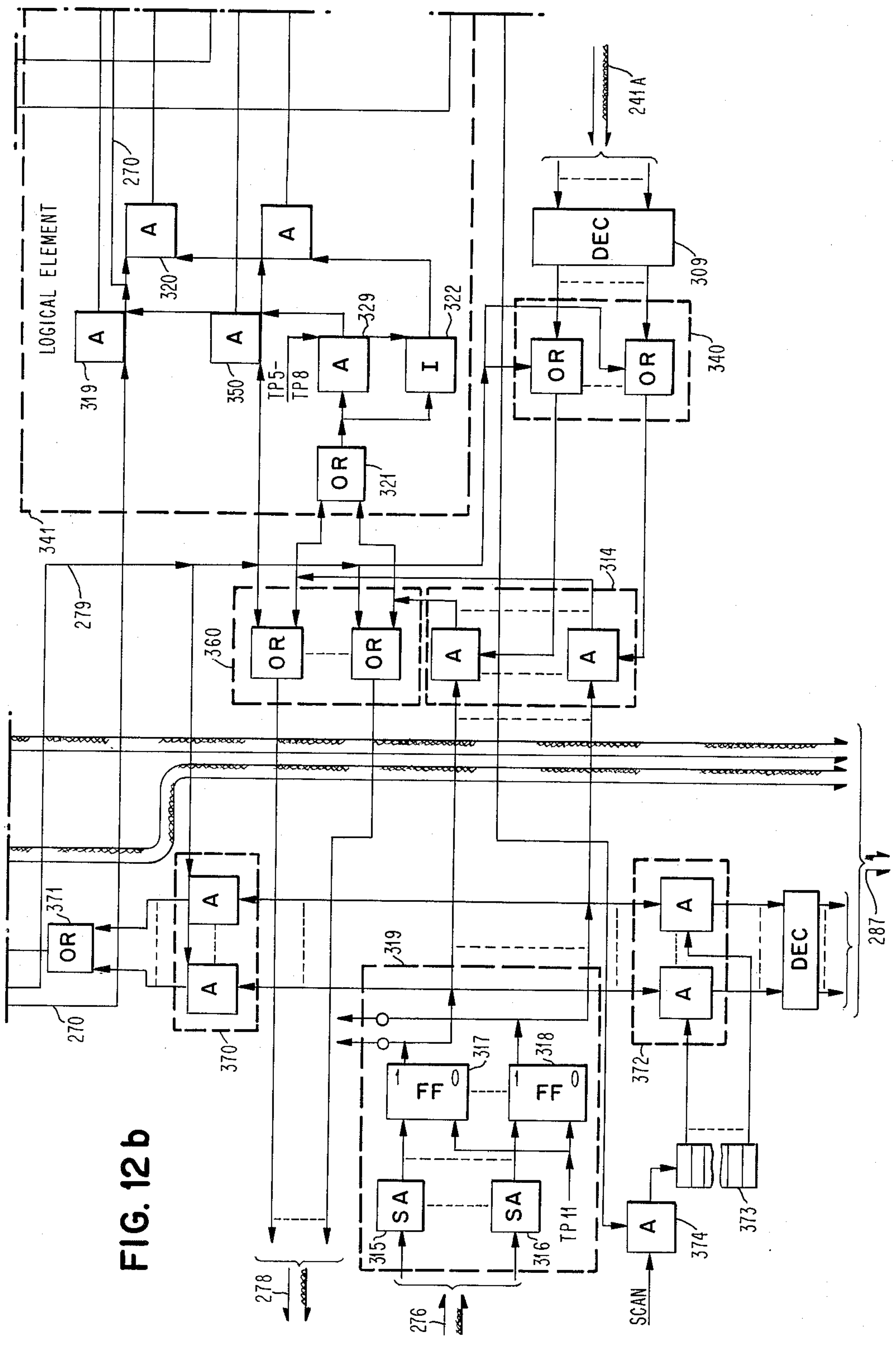
Figures 12C, 12D:
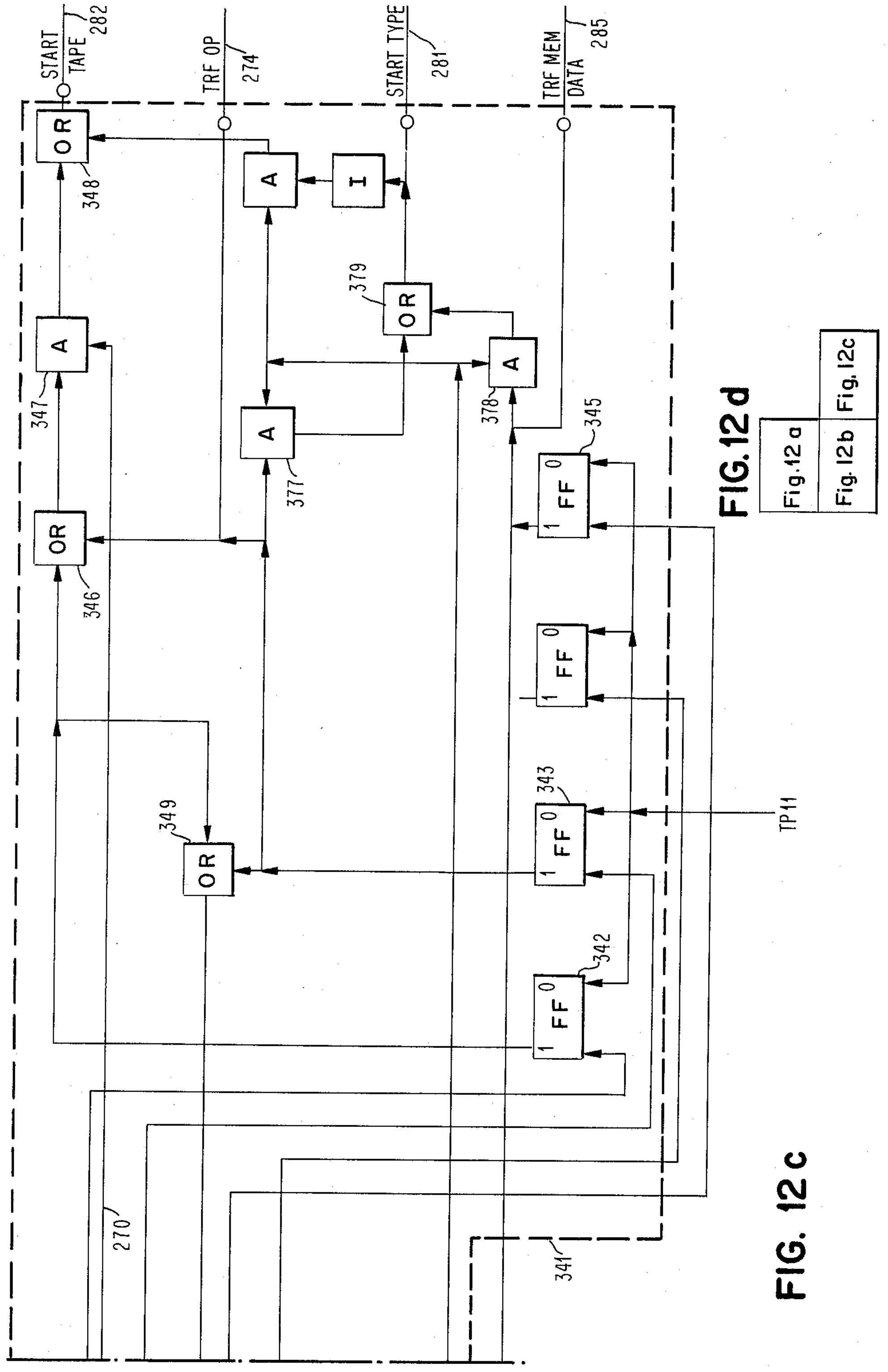

FIGS. 12A, 12B, and 12C are skeltonized schematic diagrams of a typical memory control element suitable for use in the tester shown in FIGS. 2B–2E.

FIG. 12D is a block diagram showing how the circuits of FIGS. 12A, 12B, and 12C are placed together to form a complete circuit.

*Conventions*

In the above-identified figures and throughout the following description certain conventions are employed which are familiar to those skilled in the art. Additional information concerning these conventions is as follows.

An arrowhead may be employed on drawing lines to indicate (1) a circuit connection (2) energization with a pulse or level and (3) the direction of pulse travel which is also the direction of control. Various devices referred to in the following description are well known and understood by those skilled in the art, so that it is not necessary to further define the devices for an understanding of the present invention. Further, such devices (for instance, flip-flops, AND and OR circuits) are represented in the drawings as boxes with letter symbols identifying the function of the device. Thus the symbols "A," "OR," and "FF" designate AND circuits, OR circuits and flip-flop, respectively. Other symbols may be later identified within the present description as appropriate.

For the purposes of demonstration, it is assumed that electric power for the present system is drawn from a suitable source, such as a battery having one cell terminal grounded and taps connected to other cell terminals as appropriate. In the following paragraphs it is evident that this ground may be used as a common return path from a tap to the battery. The various battery voltage taps may be identified in the drawings and description by the polarity or polarity and voltage of the cell terminal to which the tap is connected. For instance +48 v. means the tap connected to a battery terminal producing a nominal 48 volt level which is positive with respect to ground. In the description which follows, it is assumed for the sake of simplicity of description that all non-significant voltage levels are maintained substantially at ground level, and that significant levels or signals are positive-going unless otherwise stated.

*General description*

Figure 1:
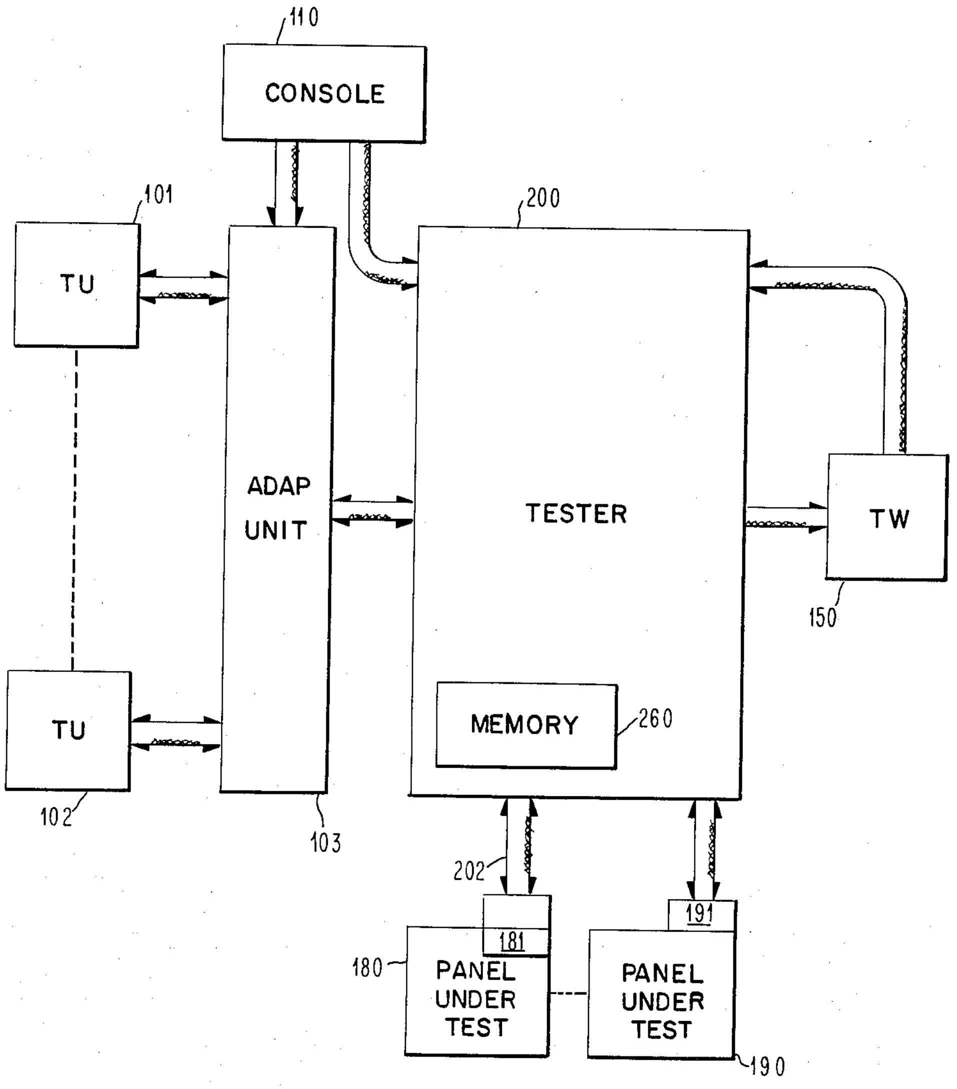
Figures 2A, 2F:
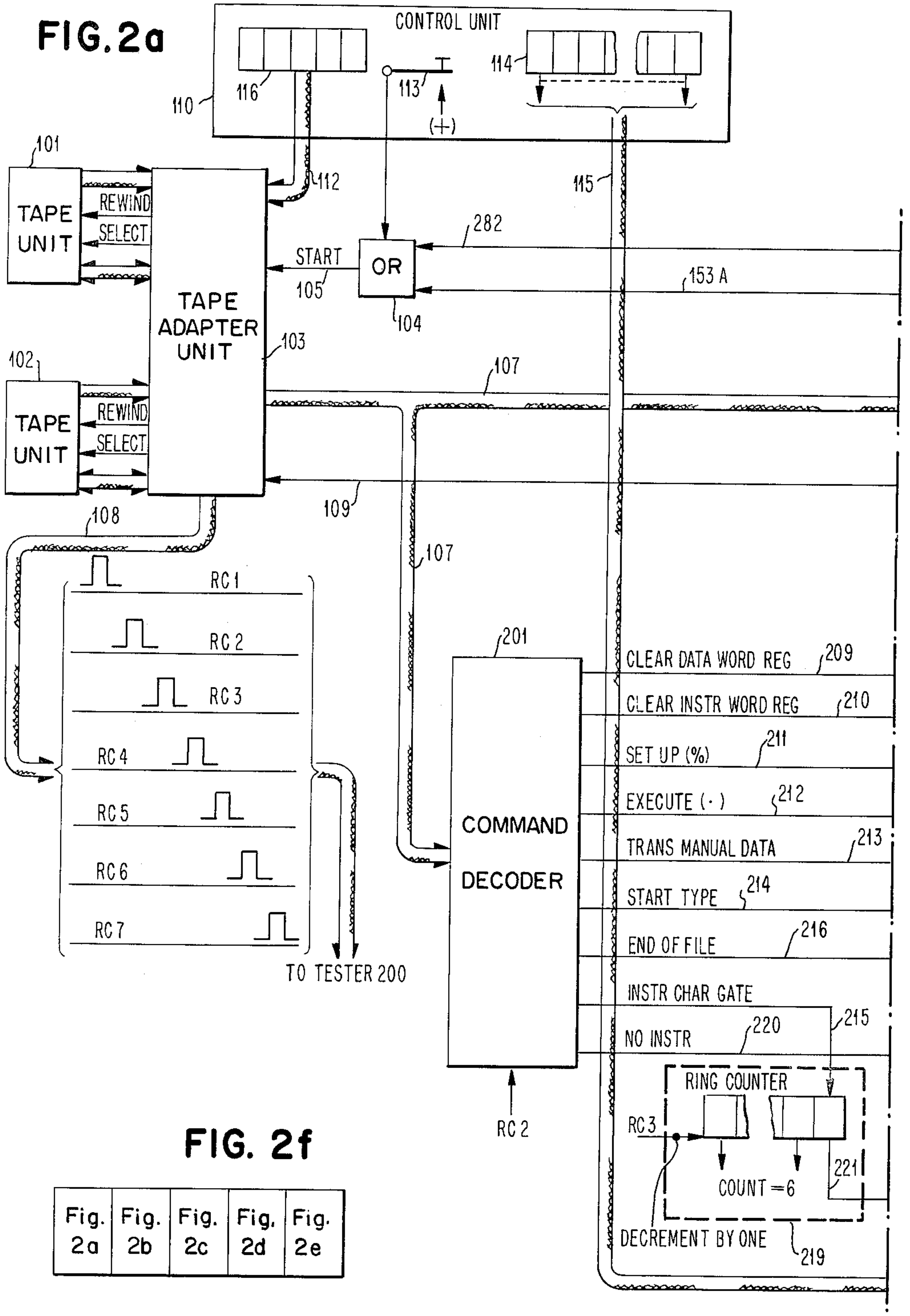
Figure 2B:
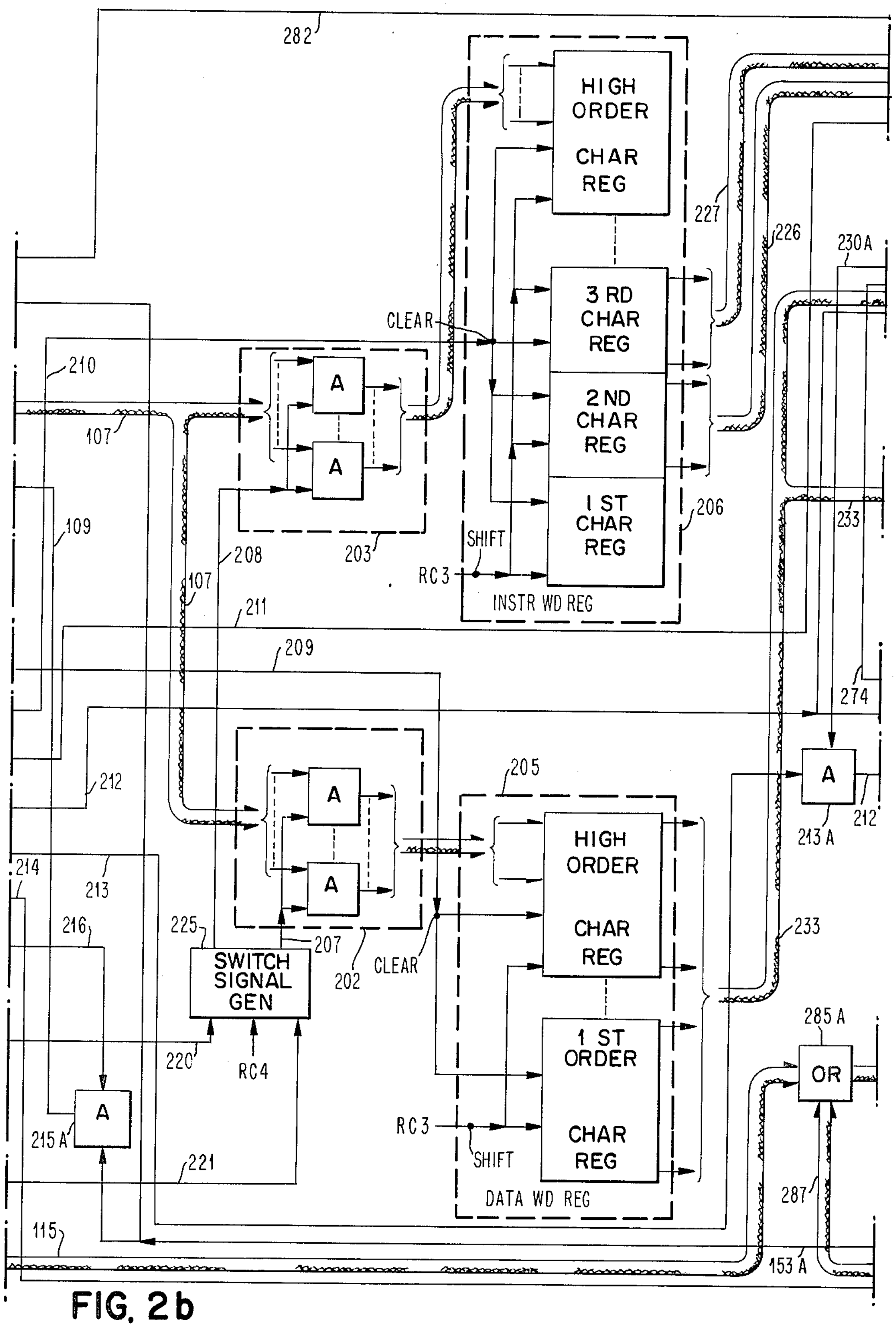
Figure 2C:
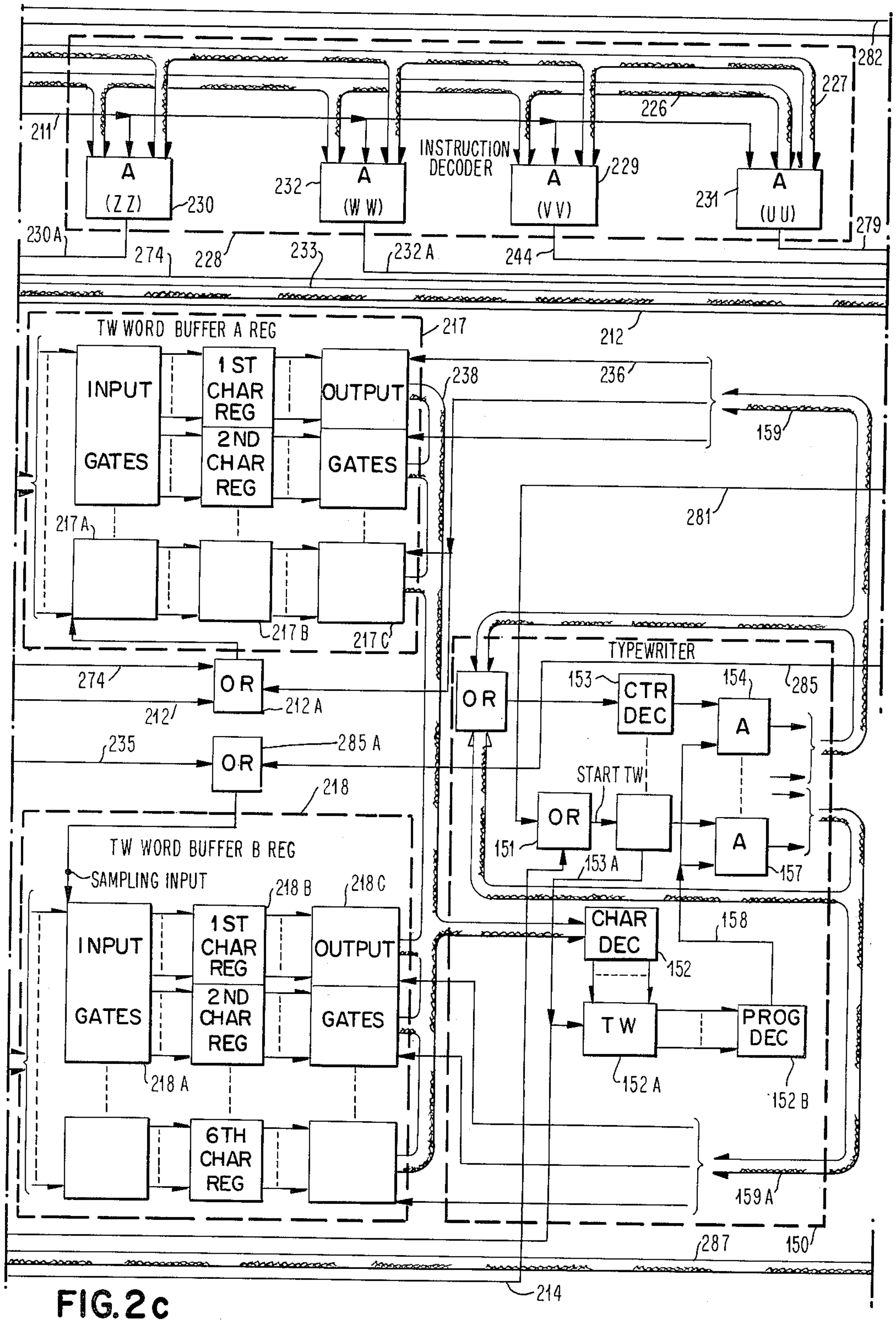
Figure 2D:
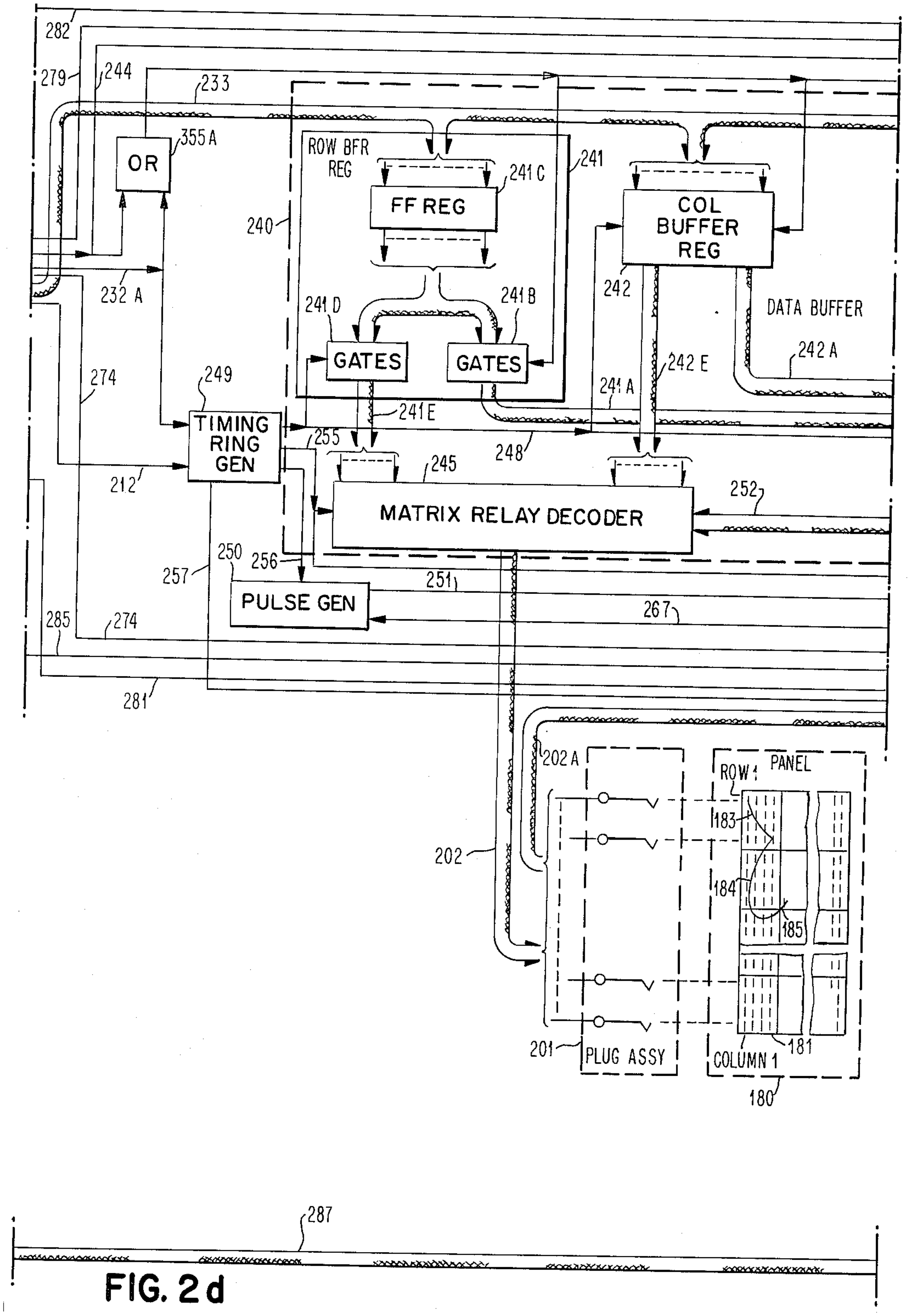
Figure 2E:
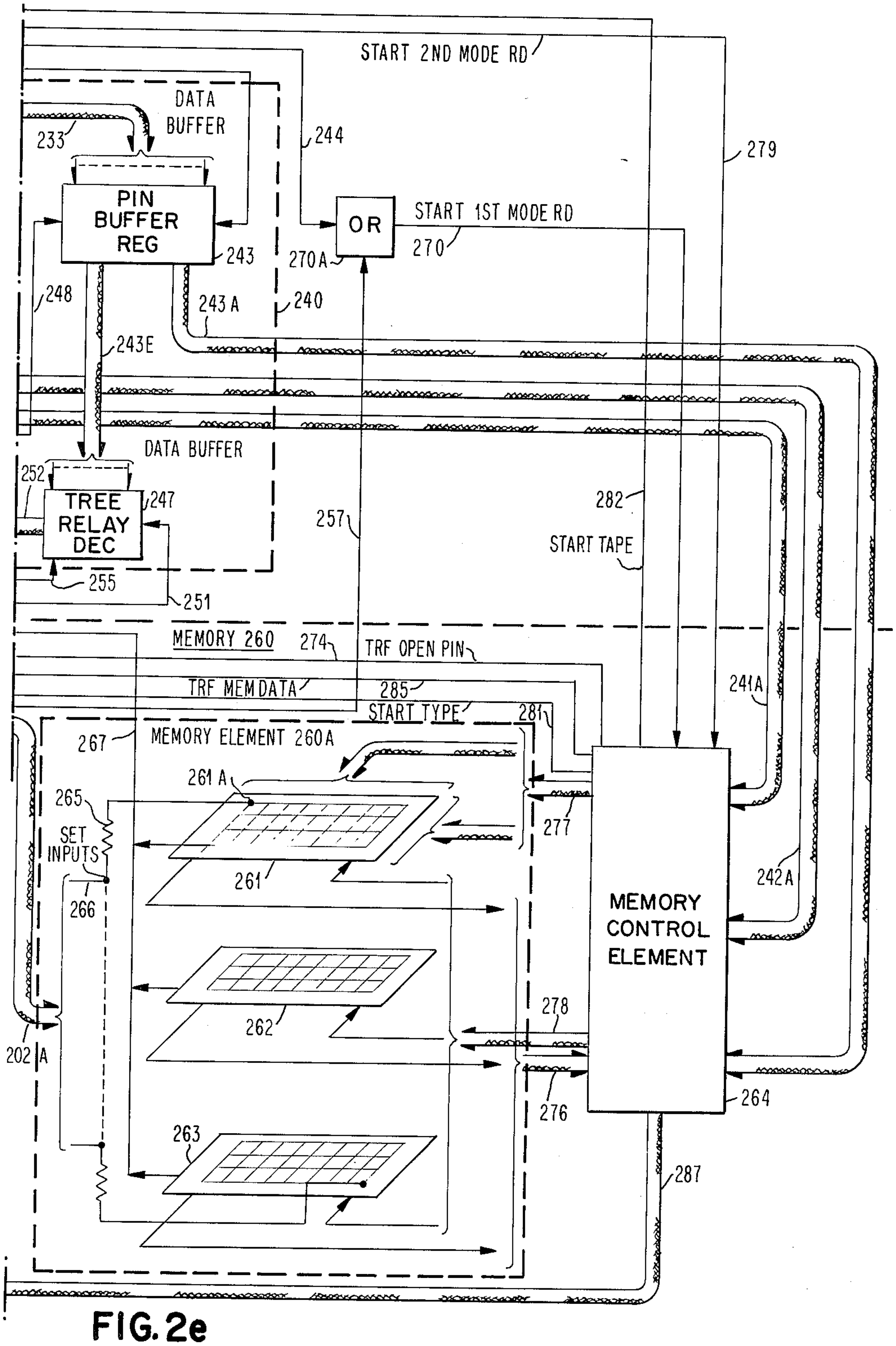

The preferred embodiment of the present invention is practiced in the system shown generally in FIG. 1. The system is used to test the sufficiency of connections established within wired electrical apparatus panels, such as 180 and 190. Within each panel, all connections to be examined are brought out to panel terminal blocks indicated as 181 and 191 which previously have been interconnected in accordance with a wiring list and therewith incorporated as points in various panel wiring networks, each network to be the subject of examination in the manner set forth below. It is pointed out that panels 180 and 190 are not necessarily of the same type, and that the wiring in one may be different from the other. In the apparatus contemplated however, panels of the same type are assumed to be wired identically to each other.

From the wiring list for each type of panel to be tested, there are generated a series of network definitions. Each network definition includes the identity (addresses) of all block terminals included therein. The addresses included in each network are encoded as data words, the data words of each network being serially recorded on a tape as one of many such records. In this manner a series of records written along the length of the tape define the uses (interconnections) of each terminal in the panel block to be tested. For simplicity, the network data records and the data words within each record appearing on the tape are interleaved with appropriate instruction words to be used in directing a program of test steps within tester 200. Included at an appropriate point within each instruction word written on the tape is an "action" or command character which is decoded to generate the various commands used within tester 200 to carry out the instructions or data received from the tape unit. In order to further facilitate testing, there is recorded on the tape ahead of all network data words the encoded type number of the panel whose network definitions follow on the tape. From the above, it is to be seen that the tape functions as a source of network data generated in accordance with the wiring list to which the actual wiring of the appropriate one of panels 180 or 190 may be compared. It is now assumed that suitable tapes have been loaded into tape units 101 and 102 and that units 101 and 102 are ready to cooperate with tape adapter unit 103 to supply panel identity data, instructions, and network data signals to tester 200.

Connections for test purposes between either of panels 180 or 190 and tester 200 are established over the conductors of a cable, such as 202, which terminates in a plug assembly. Each element of the plug assembly is disposed to engage a single, unique one of the tested panel terminals, such as those included in terminals 181. In the description which follows, it is assumed that the wiring of panel 180 is to be compared to the information stored on the tape within tape unit 101, and that cable 202 has been plugged into terminal block 181. In the preparation for the start of testing, the operator manipulates apparatus within console 110 to produce signals representing the serial number of panel 180 and to select tape unit 101 for use. The operator then manipulates a start device to place tape unit 101, adapter unit 103, tester 200 and typewriter 150 in operation. From this point until the tape within unit 101 is rewound at the end of testing of panel 180, control of tape unit 101 and adapter unit 103 is effected by signals provided from tester 200.

In response to the operation of the console 110 start device, tape unit 101 reads out via tester 200 the first-recorded type number of the panel under test to typewriter 150. Next, the contents of the console 110 apparatus storing the serial number information are read out via tester 200 to typewriter 150. Typewriter 150 thereupon prints out both sets of information as a heading describing the type and serial number of the panel currently under test. After this typing operation is complete (carriage positioned and line advanced) tape unit 101 is restarted to read the data and instruction words of the first network record to tester 200. At this point, the carriage of typewriter 150 has been positioned to print in a first column reserved for the identity of open network terminals.

The first network record data word read from the tape identifies the first terminal point in block 181 of the network under test. Accordingly, this word is used in tester 200 to apply via a selected conductor in cable 202 a signal to that terminal in block 181. Because the terminal selected in this manner is connected within panel 180 to other block 181 terminals in the same network, the signal also appears at those other network terminals. The signals appearing on terminals of block 181 are read into tester 200 and stored as 1's in the binary storage elements of a memory. Each of these memory elements is unique to a particular one of the terminals of block 181. Since all memory elements previously have been cleared (restored to 0) prior to the above-mentioned storage operation, the elements containing binary 1's at the end of the storage operation represent an image of the electrical connection of the currently examined network.

The instruction contained in tester 200 then directs it to interrogate the memory for this first data location (core) to assure that the data has been written correctly into memory. If the interrogation is successful, the core location is cleared (restored to 0) and the test continued by advancing the tape under the control of tester 200 to read the next data word (i.e., the next terminal pin address within the network) of the record. The latter address signals direct apparatus within tester 200 to select and destructively read the memory element which corresponds to the network terminals defined by the signals.

Any failure of an addressed memory element selected in this manner to produce (read out) a binary 1 is evidence of an open condition in the network terminal unique to that currently read memory element. Accordingly, upon the failure of a memory element to produce a binary 1 signal at this point in testing, the data word used to select the memory element is used to direct the tester to buffer store this word for eventual typewriter 150 print-out (in the column of the record reserved for open terminal identities) the identity of the presently considered terminal.

When the addressed element examination of the memory is completed whether or not opens have been detected and buffer stored, the memory is ready for examination to detect the presence of stored binary "1's" in any element. From the description thus far it is to be seen that the presence of such residual binary "1's" in the memory elements after the destructive readout of elements addressed in accordance with record data words represents the identity of terminal pins shorted (connected spuriously) to the network currently being examined. A scanning operation of the memory is initiated by the tester in response to an appropriate instruction read from tape unit 101. An identity data word is introduced at this time into tester storage, should a typewriter print-out be required. If a binary "1" is read from a memory element during this scan operation, such a signal is used to interrupt the scan operation and to direct typewriter 150 to print out in the appropriate columns the identity of the shorted pin so represented as well as any opens that had been detected. Upon the completion of the printing, carriage return and line advance operations, typewriter 150 produces a signal which restarts the tape unit.

In the above-described manner, each network of panel 180 is examined until all networks have been tested. When the test of a panel has been completed, an end-of-file instruction is read from tape unit 101. A signal generated in tester 200 in response to the receipt of the end-of-file instruction brings in on console unit 101 an indication that the images of all networks have been compared to the network signals generated in accordance with the wiring list. Another signal generated within tester 200 under the same circumstances causes tape adapter unit 103 to start a rewind operation in tape unit 101. At this point, the tester 200 memory elements have been cleared to "0" in anticipation of the next panel testing operation.

It is pointed out that with the above-described apparatus, an operator can be manipulating a panel, for instance 190, while selected tape unit 101 and tester 200 are conducting tests on panel 180, provided that the actual electrical connection to the tester is delayed until panel 180 has been examined. Further, so long as appropriate tapes or records are used in each of the various tape units, panels tested alternately can be of any desired type and network configuration.

*Detailed description*

*Data and test program source.*—From the General Description section, it is to be recalled that tapes 101 and 102 in combination with adapter 103 furnish to tester 200 instructions and data used in carrying out the program of test steps on a panel, such as 180, under test. The tape units and adapter unit employed preferably are of the type manufactured as 729 Model II, and Low Speed Tape Adapter Unit Model II, respectively, by International Business Machines Corporation. However, such units may be chosen from a group including other, commercially available apparatus. Since the tape and adapter units are generally understood by those skilled in the art, and do not, per se, form the present invention, description of their entire operation is not included here. The last comment also applies to control unit 110 from which signals generated by manually controlled apparatus are supplied to tape adapter unit 103 as well as tester 200. However, certain details of the operation of units 101, 102 and 103 are set forth because they relate to the manner in which the tape units and the adapter 103 cooperate with other apparatus included in the preferred embodiment of the invention. Therefore the description of tape units and the tape adapter unit which follows except for these details is confined to generalities. For purposes of description the example where the record written on tape loaded in unit 101 is to be used to test the networks of panel 180 is again chosen.

Referring to FIGS. 2A–2E, manual control of tape units 101 and 102 and tape adapter unit 103 is effected by signals generated at control unit 110. To this end, unit 110 includes manually controlled selector switch 116 which is effective to generate signals conveyed to unit 103 over the conductors of cable 112 for causing unit 103 to select (make operative) tape units 101.

Additionally, switch 113 on console 110 is manually operable to transmit a start signal via OR circuit 104 and conductor 105 to the start input of unit 103. The receipt of each signal on conductor 105 causes tape unit 103 to start selected tape unit 101 and therewith cause that tape unit to advance and read out the characters of the next record written onto the tape loaded therein. After completing the read-out operation of the words of a single record, adapter 103 may stop the selected tape unit 101, and await the receipt of another signal on conductor 105 before restarting tape 101 for the purpose of reading the next record. The manner in which signals are supplied to conductor 105 from sources other than control unit 110 is described in succeeding sections of the present description. Each word read from advancing (operating) tape unit 101 is delivered serially by character via unit 103 to the conductors of cable 107. Each character so delivered is manifested as signals substantially coincident in time which appear on combinations of the cable 107 conductors, the particular combination of signal-bearing conductors being in accordance with the value of a particular alpha-numeric character. For purposes of describing the present invention, the number of bits per character (and therefore the number of conductors in cable 107) is designated as six, and all characters are expressed in the commonly accepted and understood binary-coded-decimal (BCD) code. Both data and instruction words appearing on the conductors of cable 107 are of six characters (36 bits) each. Further, for simplicity of description it is assumed that all words of the data class contain only numerical information, while words of the instruction class contain both alphabetic and numerical characters. Other details of the format of instruction and data words are explained in later sections of the present description.

Tape adapter unit 103 is made effective in response to the application of a signal to conductor 109 cause selected tape unit 101 to rewind the tape currently placed therein. Tape adapter unit 103 also includes clock apparatus which is effective for delivering Read Clock (timing) pulses over cable 108 for use in tester 200. For purposes to be apparent later, each set or frame of pulses, which may be hereinafter referred to as "R.C. pulses" are numbered from 1 to 7. The RC1–RC7 pulses occur in staggered time sequence, in the numerical order of identification and do not overlap each other. One frame of R.C. pulses is produced for each character read from unit 103, pulses RC4 being timed to appear in substantial coincidence with the appearance of the bits of the character appearing on cable 107 conductors, and the last of the pulses appearing before the cable 107 character bits of the next word appearing on cable 107. Each of pulses RC1–RC7 appears on an appropriate one of the conductors within cable 108 for distribution to apparatus within tester 200. Lines RC1–RC7 in some cases are shown in the drawing connected to tester 200 apparatus by lines suitably labeled "RC1," "RC2," etc.

Control unit 110 also includes a set 114 of manually operable switches by which the operator causes BCD signals to be generated on the conductors of cable 115. The signals on cable 115 conductors represent the serial number of panel 180 which is to be tested. Accordingly switch set 114 includes 12 decimal type switches divided into groups of two switches each to allow the operator to set up signals expressing six separate characters of six bits each.

In order to place the present system in operation after panel 180 has been connected to tester 200 in the manner described in the general description section above, the operator sets up the serial number of panel 180 on the binary switch set 114, operates switch 116 to direct tape adapter unit 103 to select tape unit 101, and operates start switch 113. Thereupon tape unit 101 reads out the characters of the first-recorded record over cable 107 to tester 200. At this time, the word representing the serial number of panel 180 set up on switch set 114 is available to tester 200 over the conductors of cable 115. Tape unit 101 continues to serially produce instruction and data words in the order in which they have been written on the tape contained in unit 101 once the typewriter input and manual data input character have been read. Advance of tape unit 101 may be stopped by the occurrence of an interrecord gap on the tape and restarted by signals received from tester 200 over conductor 105.

*Tester 200.*—Tester 200 receives words serially by character over cable 107 from the above-described Data and Test Program source. The words may represent the identity of the test panel currently being examined, instructions, or data. The instruction words incoming to tester 200 are distinguishable from data words in that the first character of each instruction word is one of the "action" characters represented in Table I.

*Table I*

ACTION CHARACTERS

| No. | Character | Use |
|---|---|---|
| 1 | * | Precedes all instruction words having significant information in characters 2–6. |
| 2 | % | Set-up. |
| 3 | . | Execute. |
| 4 | / | Start type-out. |
| 5 | @ | Clear Data Reg. |
| 6 | - | Clear Instruction Reg. |
| 7 | # | Transfer manual input data to TB. Buffer Reg. |
| 8 | 0 | End of file. |

*Instruction and data input.*—In programming the present device, "action" characters of the above-mentioned type are reserved for use within a particular decoder (command decoder 201), and are not found in words of other classes. These action characters are used to generate a particular command appropriate to the value of the sensed character. In order to insure that decoder 201 generates suitable command signals for use within tester 200 (for instance, to direct the received data and instruction word characters to suitable registers within tester 200), each incoming character is examined (tested) by command decoder 201. Accordingly, conductors of cable 107 are connected to the inputs of command decoder 201.

Command decoder 201 includes a series of AND circuits. Each AND circuit in the series has inputs connected to appropriate ones of the cable 107 conductors and is effective when the bits of a particular action character are present on the conductors of cable 107 and when these AND circuits of decorder 201 are sampled by an RC2 pulse from unit 103 to produce a signal on the one of its output conductors 209–215 appropriate to the particular command character sensed. The appearance of the characters on cable 107 and listed in Table I cause command decoder 201 to generate on the various decoder outputs 209–215 the signals designated in the table. The signal produced one any of conductors 209–215 are used as commands throughout tester 200 in a manner to be described in later sections of the present description.

Within decoder 201 there also is apparatus responsive to the generation of a command furnished on any output 209–215 and to the receipt of the above-mentioned RC2 pulse for generating a signal on output 216. Each signal appearing on conductor 216 is effective to reset six step, ring type word counter 219 to six count. Resetting of counter 219 to six is carried out in anticipation of the receipt of the next five characters which are of an instruction nature. Command generator 201 also contains apparatus operative in the absence of a signal on any of the generator 201 decoder outputs to produce a signal in conductor 220 at time RC2.

Referring next to work counter 219, the setting of counter 219 at six is effective to cause the counter to produce a signal on its output conductor 221 so long as the counter remains set at six. The count in 219 is reduced by one in response to the application of each RC3 pulse as that pulse is received from unit 103 and applied to the decrement-by-one input of counter 219. Consequently, the count registered in counter 219 at any time after the receipt of the first character of an instruction word represents the number of characters of the instruction word yet to be received over cable 107.

As indicated in Table II, certain of the last five characters of some instruction words contain information which is to be used within tester 200. Such information as well as the substance of information contained in the data words which make up each record read from tape unit 101 are to be switched to instruction word register 206 and data word register 205, respectively. Accordingly, AND gates 202 and 203 interposed between the conductors of cable 107 and the inputs of registers 205 and 206, respectively, are used to switch (i.e., directively admit) the bits of characters received over cable 107 to the appropriate one of the registers.

various character registers of the appropriate word register. Pulses for effecting such shift operations in registers 205 and 206 are effected by RC3 signals connected to the shift inputs from unit 103.

*Table II*

INSTRUCTION WORDS (ALL CHARACTERS IN BCD CODE)

| Word Use | Character 1 (Action) | Character 2 | Character 3 | Character 4 | Character 5 | Character 6 |
|---|---|---|---|---|---|---|
| Data Reg to TW Buf A Reg Typewriter | * | Z | Z | 0 | 0 | 0 |
| Data Reg to Relay Matrix into Memory Control. | * | W | W | 0 | 0 | 0 |
| Read Data Buffer into Memory Control | * | V | V | 0 | 0 | 0 |
| Scan Memory | * | U | U | 0 | 0 | 0 |
| Other (as required) | * | O | O | 0 | 0 | 0 |

Each of AND gates 202 and 203 is a set of six parallel AND circuits having sense inputs commonly connected to sense lines 207 and 208, respectively. The other (conditioning) inputs of each AND circuits in each set is connected to an appropriate one of the various conductors of cable 107. The outputs of the circuits of each of AND gates 202 and 203 are connected to the various first stage (character) inputs of data word and instruction word shift registers 205 and 206, respectively. Functioning as switches, gates 202 and 203 normally are not sensed, and therefore block passage of character bits from cable 107. Gates 202 and 203 become effective to pass such character bits when sensed by signals on lines 207 and 208. The control of the appearance of signals on conductors 207 and 208 is effected by apparatus within switch signal generator 225.

The operation of generator 225 is in turn controlled by the signals appearing on conductors 220 and 221 in the manner next set forth. From the preceding description, it is to be recalled that the appearance of a signal on conductor 220 or 221 represents, respectively, the absence of an action character or the presence of an action character on the conductors of cable 107. The apparatus within control 225 is effective when sensed at pulse time RC4 and in the presence of a signal on conductor 221 for producing an output signal on conductor 208. Similarly, generator 225, when sampled by read clock pulse RC4 and signals are present on both input conductors 220 and 221 (counter 219 having been stepped to six count by RC3 pulses), is effective for producing a signal on conductor 207.

Assuming that an instruction word containing an action character and five additional, information characters is being received over cable 107, it is to be seen that AND gate 203 is conditioned during the receipt and decoding of the first word character within decorder 201. Consequently, the characters of the instruction word are to be admitted serially through AND gate 203 to the input of register 206. Similarly, if the word currently being received is of the data class, so that a signal is present on conductor 207, AND gate 202 passes the six successive sets of word character bits serially appearing on cable 107 to the input of register 205.

*Data and instruction word registers.*—For convenience of description, each of word registers 205 and 206 is regarded as a series of character registers, each such character register comprising a group of bistable storage elements effective for storing and producing signals in accordance with the value of character bits stored therein. Each of registers 205 and 206 receiving serially transmitted characters of data and instruction words, respectively, at its input in the above-described manner accepts and temporarily stores the bits of each such character in its high order character register. Each of word registers 205 and 206 is a shift type and is effective in response to the application to each pulse signal applied to its shift input to effect a parallel shift of character bits stored in any one character register into the next lower order character register elements until the characters of an entire word received over cable 107 have been stored in the In the case of register 205, all 36 bits of the word characters registered therein are presented in parallel over the conductors of cable 233 to the inputs of typewriter word buffer A register 217 and to the inputs of data buffer 240. Consequently, the bits of a word register in the elements of register 205 may later be admitted to buffer A register 217 and to decoder 240 in accordance with the dictates of the next instruction word received at tester 200.

In the case of register 206, the signals geenrated on the outputs of only the second and third character registers are transmitted over the conductors of cables 226 and 227 to the inputs of instruction decoder 228. The uses to which the distributed signals from registers 205 and 206 are put, as well as the manner of use are set forth in following sections of the present description.

Registers 205 and 206 are cleared (i.e., all significant signals removed from the register element outputs) in response to the application of signals to the clear inputs thereof. Clear input signals are supplied to registers 205 and 206 by command decoder over conductors 209 and 210, respectively.

*Instruction decoder.*—Instruction Decoder 228 comprises a series of AND circuits, such as 229, 230, 231, and 232. Each such AND circuit has a first input connected to conductor 211 on which command decoder 201 is operative to deliver a "set up" command signal from generator 201 and another set of inputs connected to the conductors of cables 226 and 227 which bear significant level signals expressing the second and third characters stored in register 206. As is to be shown later, the characters expressed on cables 226 and 227 correspond to the instruction word received at the time the "set up" command on conductor 211 is received, the characters expressed by signal bits appearing on the conductors of cables 226 and 227 may correspond to those shown as instruction words 1–4 in Table II. As a result, each AND circuit 229–231 produces a significant level on its output conductor when an appropriate instruction word has been written into and stored within register 206 and a command signal is received over conductor 211.

*Word buffer registers.*—Word buffer A register 217 and word buffer B register 218 are used to store word bits transmitted from data word register 205 over cable 233 and from switch set 114 of console 110 over cable 115, respectively. Additionally, register 218 is used to store word bits transmitted from memory control element 264 over the conductors of cable 287. Words stored in registers 217 and 218 are made available a character at a time for use within typewriter 150. The inputs of registers 217 and 218 are arranged to accept in parallel fashion the thirty-six bits of each six character word presented when a conditioning signal is applied to conductor 274 or the sampling input of the input gates 218A of register 218 via conductor 235, respectively.

Registers 217 and 218, like registers 205 and 206, are regarded as comprising a series of character registers. The application of a signal to any of the sampling inputs of the output gates over a conductor, such as 236, is effective to read the bits stored in the appropriate character register via output busses 238 to input character data decoder 152 of typewriter 150. The manner in which the signal is applied to the sampling inputs of the register 217 and 218 output gates is described in sections of the present description which follow.

*Data buffer.*—Data buffer 240 is comprised of row buffer register 241, column buffer register 242 and pin buffer register 243. Each such register, has inputs of storage register flip-flops (such as 241C) connected to receive in parallel appropriate bits of the data word presented on the outputs of register 205 over cable 233. The register flip-flops are such so that the bits of one word received at the inputs of the data buffer registers 241, 242, and 243 can be written over a set of bits already stored in those flip-flops. In the presence of a sampling signal provided over conductor 244, first output gates (such as 241B) of registers 241, 242, and 243 become effective to admit signals representing bits received from the conductors of cable 233 and currently stored therein to the data buffer output cables 241A, 242A, and 243A for transfer to memory 260. The second output gates (such as 241D) of registers 241, 242, and 243 are sampled and conditioned to admit to the conductors of output cables 241E, 242E, and 243E the signals representing bits stored in those registers.

The output signals produced on the conductors of cables 241E, 242E, and 243E are used to drive relay decoders 245 and 247, while signals present on cables 241A, 242A, and 243A drive address apparatus within memory control element 264.

Pin relay decoder 247 is of the tree type and has relays which are selectively operated in accordance with bit signals admitted to the decoder 247 inputs over the conductors of cable 243E. After the relays of decoder 247 have been selectively operated (set), a unipolar pulse received from generator 250 over conductor 251 at decoder 247 is applied to one of the conductors of cable 252 in accordance with the operated combination of relays within decoder 247.

The relay at one of the cross points within matrix decoder 245 is operated, the choice of cross points being in accordance with the value of data bits read from registers 241 and 242 over the conductors of cables 241E and 242E. The operated one of relays within decoders 245 and 247 is effective for conveying to one and only one of the conductors in output cable 202 the pulse appearing on one of the cable 252 conductors. Each of the conductors of output cable 202 is connected via plug assembly 201 to a particular (unique) one of the pins of terminal block 181 within panel 180. Thus it is to be seen that by the selective operation of decoders 245 and 247 and the subsequent operation of generator 250, the output pulse of generator 250 is applied to the one of the pins in terminal block 181 designated by data stored in data buffer 240.

*Timing ring.*—Timing ring 249 is used to generate sequentially occurring signals which are used to make operative data buffer 240, pulse generator 250, memory control element 264. Accordingly, generator 249 is operative in the presence of coincident signals on input conductors 212 and 232A to subsequently generate one cycle or set of sequential, non-overlapping signals on each of conductors 248, 255, 256, and 257 in the order named.

*Memory*

Memory 260 of tester 200 may be of any of a number of types capable of storing binary signals and destructively reading such stored signals by address, but preferably is of the well known magnetic core type shown in the drawings. Memory 260 includes memory element 260A and control element 264, and may be operated in write mode and in first and second read modes. In the first read mode, signals representing the address of the core to be read within element 260A are generated externally and applied to appropriate inputs of control element 264, and the application of a signal to the "Start First Mode Read" input line 270 effects a single, read operation of the addressed core in memory element 260A. In the second mode, each core in element 260A is to be read serially on the basis of address signals generated within control element 264. Accordingly, element 264 responds to a signal applied to "Start Second Mode Read" by operating through a series of cycles to read out the contents of each core until a reading scan of all memory cores has been completed.

Element 260A has a plurality of core planes 261, 262, etc., in each of which the cores (forming the individual storage elements of the memory) are arrayed in predetermined order. From the above description, it is to be recalled that each core in each plane 261–263 corresponds to a particular one of the points or terminals on block 181. At this point it is mentioned that the individual terminals within block 181 are divided into like groups of terminals or pins, each group of pins being disposed in a rectangular configuration on block 181. These rectangular pin groups are arrayed in rows and columns. In the present embodiment, the cores in each plane, such as 261, correspond to the pins of those groups disposed in one particular column. The format of data words received in buffer 240 is such that the signals produced on the conductor of output cables 243A and 242A represent the identity of a pin within each group included in a row of such pin groups on block 181. Consequently the signals on the same conductors also represent the identity of cores within each of planes 261–263 which correspond to each terminal or pin so identified. The format of data words inserted in buffer 240 is such that the one of columns in which the particular pin identified by the data word is disposed is represented by signals produced on conductors of cable 241A. The manner by which the signals representing pin and core address information (present on cables 241A, 242A, and 243A) are employed in the first reading mode of cores within element 260A is set forth in the description which follows.

Figure 8:
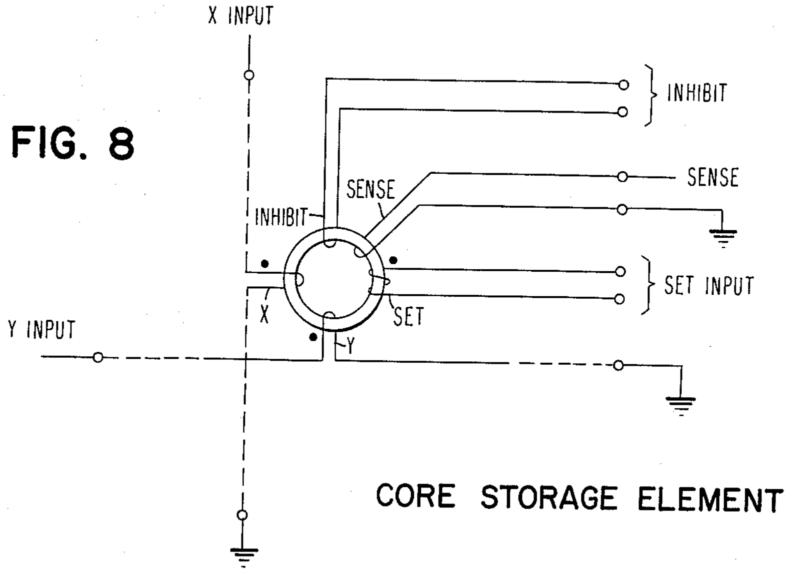
FIG. 8 is a schematic diagram of a representative core storage element.

*Writing.*—Turning to FIG. 8, each core included in element 260A is of the type generally shown in FIG. 8. Each such core has single turn X, Y, inhibit, and sense windings and a multiturn winding used as a set or write input. One side of the set winding of each of a core such as 261A is connected via a resistor (such as 265), a conductor (such as 266) of cable 202A, and a plug of assembly 201 to one of the terminals (such as 182) within terminal block assembly 181 to which the core under consideration corresponds. The other sides of the set windings of all cores in element 260A are connected by a common return path 267 to pulse generator 250. From the foregoing description of generator 250 and decoders 245 and 247 of data buffer 240, it is to be seen that the unipolar pulse applied to a conductor of cable 202 and a selected terminal pin, such as 182, also is conveyed via a conductor of cable 202A to one of the cores in planes 261–263 to which the selected terminal pin corresponds.

From the foregoing description of panel 180, it also is to be seen that the same signal applied via cable 202 to a terminal in block 181 in accordance with data set into buffer 240 also appears at other terminals in the same wiring network and connected to the selected pin by wiring internal to panel 180 (for instance by jumper wires such as 183, 184 and 185). As a result, the signal selectively applied via cable 202 to the terminal pin 182 of a particular network also is conveyed via the appropriate conductors of cable 202A to the set windings of cores in element 260A which correspond to other terminals of that same network.

It is assumed that for the moment that prior to a writing operation, such as the one considered here, all cores in element 260A have been switched to their 0 state. All signals appearing on conductors of cable 202 and accordingly applied to the set inputs of the various cores are effective to switch such cores from their normal, "0" to "1" state, and therewith write into element 260A an image of the network identified by the first pin in the network at the output of decoder 245. To this end, the pulse appearing on conductor 251 is positive-going. Consequently, all cores receiving at their set input windings such a pulse are left at the conclusion in like flux condition, which is hereinatfer regarded as "1" state for all such cores. At this time, all cores which do not receive signals on their set inputs over the conductors of cable 202A remain in their "0" state.

*First mode reading operations.*—Reading operation of cores in memory element 260A is effected on the basis of externally generated addresses. As a consequence of the single cycle, first mode read operation of memory 260, it is to be seen that the core specified by the address currently transmitted from buffer 240 is destructively read. If the address core has stored a "1," apparatus within element 264 is effective to produce a signal on output conductor 282. Conversely, if the addressed core has stored a "0" at the time prior to readout, element 264 apparatus is effective to produce a signal on conductor 274.

*Reading in the second mode.*—The application of a start signal to memory control element 264 over conductor 279 is effective to start a scan operation of all memory elements starting with the lowest order element and proceeding to the highest order element under the control of signals generated within element 264. The receipt of a signal from conductor 279 is effective to make addressing apparatus within element 264 effective to systematically apply coincident X and Y drive signals to successive cores in all planes within memory element 260A, and to apply to the serially connected inhibit windings of cores in all planes current during the write-back portion of the read-write cycle. The apparatus examines in a parallel fashion all memory planes until the second mode (scan) readout of all cores in memory element 260A has been completed. Apparatus within element 264 coupled to the sense lines contained in cable 276 is operative upon the reading of a 1 signal from any addressed core for producing a signal on output conductor 285, and is effective upon the reading of a 0 in the currently addressed core to continue the scan operation. At the end of the second mode read operation apparatus within element 264 is effective to produce a signal on "Start Type" conductor 281 in the event a signal has been read during the second mode read operation and to read out signals representing the identity of the core storing a 1 signal over the conductors of cable 289. The manner in which the signals produced on output conductors 274, 282, 285, and 281 are employed is set forth in a following section of the present description.

*Typewriter 150.*—Typewriter 150 may be of any type suited to accept and type out characters upon the receipt of BCD-encoded signals at its inputs. However, typewirter 150 preferably is of the type manufactured under the Model No. 868 by International Business Machines Corporation. Since such typewriters are commerically available and understood to those skilled in the art, details of the operation of the typewriter are not set forth in the present description except insomuch as such operation contributes to an understanding of the present invention.

Typewriter 150 includes decoder 152 which is effective upon the application of six character bits to its input to produce at its outputs signals suited to operating the appropriate drive magnet of the typewriter. From the above description, it is to be recalled that signals representing BCD characters in words expressed in buffer A and buffer B registers 217 and 218 are produced a character at a time at outputs 238 and 239, respectively, in response to the application of sampling signals to the appropriate character buffer output gates via conductors in cables 159 and 159A. In order to cause the various characters stored in registers 217 and 218 to be read out to typewriter 150, a start signal applied to conductor 214 by command decoder 201 or to conductor 281 by memory control element 264 is conveyed via OR circuit 151 to the start input of typewriter counter and decoder 153. At such a time, counter-decoder 153 is therewith made effective to cause a first one of AND circuits 154–157 (which corresponds to "0" count registered within counter-decoder 153) to be enabled and thereupon responsive to the application of an enabling signal over conductor 158 to produce an output on one of the conductors in cable 159A. As a consequence, signals present on the appropriate, high order character register within the word of registers 218 are admitted to the input of decoder 152. Consequently, typewriter 152A is driven to print out a character by the first character signals applied to decoder 152. After the printing operation has finished, typewriter 152A transmits to its program decoder 152B a signal which causes decoder 152B to sample the various AND circuits 154–157, which now have been conditioned to indiacte the identity of the character register within the currently active one of word registers 217 and 218 containing the character to be admitted next to decoder 152. In this manner, typewriter 150 continues to operate to print out the characters of the word contained the active one of registers 217 and 218. At the conclusion of the print out of a word, decoder 153 generates a line feed signal on output conductor 153A which prepares typewriter 152A to receive characters for further print out operations. The signal produced on output conductor 153A also is conveyed to AND circuit 215A and to OR circuit 104. The signal present on conductor 153A is effective to cause selected tape unit 101 to restart by applying a start signal to unit 103 via OR circuit 105 and conductor 105. The presence of an end-of-file signal on conductor 215 produced by command decoder 201 enables AND circuit 215A to pass the above described signal on conductor 153A to start tape unit 101 in a rewind operation.

*Operational description*

In order to complete the showing how the above described device achieves the objects and advantages of the present invention, a description of the operation of the device is next given in terms of step by step program operations. Appropriate parts of a representative program are set forth in Table III, where the numerical sequence of the interrelated program operations or steps is set out. In Table III, the operation number set out in the left hand column represents the numerical order in which the corresponding word expressed in the middle column is received from tape unit 101 and adapter 103. Within this middle, word column, the position assignment of individual characters is indicated by the number over-lying the character within the column heading.

*Table III*

| OP | Word by Character Number 123456 | Meaning |
|---|---|---|
| 1 | *ZZ000 | Transfer data register to buffer A register instruction. |
| 2 | aaaaaa (see note) | 6-digit part number. |
| 3 | %00000 | Set up instruction. |
| 4 | .00000 | Execute instruction. |
| 5 | @00000 | Clear data register instruction. |
| 6 | aaaaaa (" ") | 6-digit numerical panel type number. |
| 7 | #00000 | Manual data transfer to type register B instruction. |
| 8 | /00000 | Start type out instruction. |
| 9 | interrecord gap | Type out until type disconnect restarts tape. |
| 10 | -00000 | Clear instruction register instruction. |
| 11 | @00000 | Clear data register instruction. |
| 12 | *WW000 | Transfer first pin in net from data register to relay matrix instruction. |
| 13 | aaaaaa (" ") | First pin data. |
| 14 | %00000 | Set up instruction. |
| 15 | .00000 | Execute instruction. |

*Table III.*—Continued

| OP | Word by Character Number 123456 | Meaning |
|---|---|---|
| 16 | Interrecord gap | Set up decoder relays—cycle timing generator—read memory and check first pin—if OK restart tape—if error first pin transfer to buffer A register and restart tape. |
| 17 | -00000 | Clear instruction register instruction. |
| 18 | @00000 | Clear data register instruction. |
| 19 | *VV000 | Transfer pin data to memory control input. |
| 20 | aaaaaa (see note) | Second pin data. |
| 21 | %00000 | Set up instruction. |
| 22 | .00000 | Execute instruction. |
| 23 | @00000 | Clear data register instruction. |
| 24 | .00000 | Clear instruction register instruction. |
| 25 | *UU000 | Scan memory for shorts instruction. |
| 26 | aaaaaa ('' '') | Network address. |
| 27 | %00000 | Set up instruction. |
| 28 | .00000 | Execute instruction. |
| 29 | Interrecord gap | Carry out scan operation. |
| 30 | 000000 | End-of-file. |

NOTE.—"a" represents any decimal digit.

*Entering panel data.*—Operations 1–11 shown in Table III are used in entering the type and serial number data appropriate to the panel 180 which is assumed to be currently under test. It is to be recalled that the serial number data of panel 180 has been set into switch set 114 of console unit 110 by the operator prior to the start of tape unit 101, and that the first data word recorded on the tape represents the characters of type number of panel 180. The part of the program using the manually-generated and tape-generated panel identity data are described next.

*Operation No. 1.*—After tape unit 101 and adapter 103 have been placed in operation, the first word received from the above described data and test program source (*ZZ000) over cable 107 is of the instruction class. The first, (*), character is detected by decoder 201 and accordingly produces a signal on conductor 215 which resets counter 219 to six. Resetting counter 219 to six in this manner allows generator 225 to produce on conductor 208 (at RC4 time) signals which sample AND gate 203. Consequently, the first and five succeeding characters of the presently-considered instruction word are admitted to register 206 for temporary storage. Once the second and third characters of this word have been placed in the second and third character registers of word register 206, the combination of signals produced on conductors of cables 226 and 227 is such as to select for subsequent operation one of AND circuits 230–232 within instruction decoder 228, the choice being in accordance with the value of the word expressed in register 206. In the case of the Operation No. 1 instruction word, circuit 230 is prepared to produce a signal on output conductor 230A. Tester 200, having received the characters of the instruction word received during Operation No. 1, is in condition to receive the characters of the next word.

*Operation No. 2.*—The second word received over the conductors of cable 107 is of the data class and comprises the part of the characters of the type number of panel 180. Since counter 219 has been decremented by the various RC3 pulses received thereat during the receipt of the six characters of the instruction word used in Operation No. 1 and consequently has been restored to its count=6 condition, and since the first character of the presently received word is not one to which the input AND circuits of decoder 201 respond, generator 225 produces a sampling signal at RC4 time on conductor 207 which, in turn, causes generator 225 to produce sampling pulses on conductor 207 at time RC4. Consequently, the AND circuits of gate 202 are sampled and admit characters received over cable 107 to the input of data word register 205. When the six characters of the data word have been inserted in the various character registers of word register 205, Operation No. 2 is complete.

*Operation No. 3.*—Only the first character of instruction word received during Operation No. 3 (%) includes significant information, characters two-six all being zeros. The detected character is effective to cause command decoder 201 to generate "set up" signal on conductor 211. The latter signal causes the selected AND circuit 230 within instruction decoder 228, to produce a signal on its output conductor 230A. The latter signal, applied to the conditioning input of AND circuit 213A, prepares the latter circuit to admit a command signal from conductor 213 to the sampling input of register 218.

*Operation No. 4.*—The instruction word received on cable 107 which dictates Operation No. 4 is, like the Operation No. 3 word, comprised of a first, action character and five other characters of all zeros. The detected Operation No. 4 action character, (.), is effective to cause command decoder 201 to produce an "execute" command signal on conductor 212 which is applied via OR circuit 212A to the sampling input of input gates 217A within buffer A register 217. Consequently, the word stored in data word register 205 is written into the elements of register 217B over any bits already contained therein.

*Operation No. 5.*—The word which dictates Operation No. 5 is, like the word used in Operations 3 and 4, comprised of a first, action character and five other characters of all zeros. The action character of the Operation No. 5 instruction words, @, is effective to cause command decoder 201 to produce a "clear data register" signal on conductor 209. The latter signal is applied to the clear input register 205, therewith restoring all register elements to zero and preparing register 205 to receive a next data word.

*Operation No. 6.*—The Operation No. 6 word comprises characters representing further numerical data in the type number of panel 180. The operation is substantially identical to that described in connection with Operation No. 2 and results in the storage of further type number data characters descriptive of panel 180 in register 205.

*Operation No. 7.*—Instruction word number 7, like the words received during the performance of Operations 3–5, comprises a significant first, action character and five other characters of all zeros. The detected Operation No. 7 action character, (#), causes command generator 201 to produce a "transfer manual data" signal on conductor 213. The latter signal is passed through now-conditioned circuit 213A and applied to the sampling input of the input gates of word buffer B register 218. These input gates thereupon admit the serial number of panel 180 data bits which are present on the conductors of cable 115 to the inputs of the register elements in 218B. Therewith the serial number data describing panel 180 is stored in register 218 and the type number data is stored in registers 217 and 205 in anticipation of a printing operation within typewriter 150.

*Operation No. 8.*—The word received on cable 107 which dictates Operation No. 8 is comprised of a first, action character and five other characters of all zeros. The Operation No. 8 action character (/) detected by command decoder 201 is effective to cause decoder 201 to produce a "start type" signal on conductor 214. The latter is applied to TW start input of typewriter 150 via OR circuit 151. Consequently, typewriter 150 initiates a type-out operation under the control of its internally generated program. During the execution of a first part of this program, the character data stored in register 217 is printed out by typewriter 150.

*Operation No. 9.*—This operation is used to allow typewriter 150 to operate and therewith print out the identity of panel 180 which is under test. At this time, an interrecord gap in the program written on the tape being read in unit 101 allows adapter unit 103 to stop the advance of tape unit. This interval in which tape unit 101 is stopped allows the printing operation in typewriter 150 to proceed to completion in an uninterrupted manner. Tape unit 101 and adapter unit 103 remains quiescent until a start signal is applied to unit 103 later in the performance of the presently considered operation.

The first of a series of command signals within typewriter 150 causes the data stored within register 217 to be admitted to typewriter 150, character by character. These characters direct the first part of the printing operation. When the typewriter 150 finishes this part of the printing operation (employing data stored in register 217), commands generated within typewriter 150 are applied to admit the characters stored in 218 to typewriter 150, which continues its printing operation on the basis of characters so supplied. When this second part of the printing operation is complete, a signal generated by the typewriter 150 program is applied via OR circuit 212A to the sampling input of register 217. Consequently, the characters in register 205 are admitted to word buffer A register 217. Consequently, the contents of data word register 205 are written into register 217B over the already existing information. Typewriter 150 repositions its carriage to print out the next-received characters and then continues its printing operation, this time employing data newly stored in word buffer register 217. When the last described typing operation is complete, the line feed of typewriter 150 is advanced and its carriage appropriately positioned in anticipation of further printing operations within typewriter 150. When the latter operations are complete, typewriter 150 transmits a signal over conductor 153A via OR circuit 104 on conductor 105 to adapter 103, which restarts tape unit 101. Consequently, the reading of data and instruction words from tape 101 is resumed at this time.

*Operation No. 10.*—The word received over cable 107 which dictates Operation No. 9 is comprised of a first, action character and five other characters of all zeros. The Operation No. 8 action character, (—), detected by decoder 201 is effective to cause decoder 201 to produce a "clear instruction register" signal on conductor 210 which is applied to the clear input of register 206. Consequently, all storage elements in register 206 are reset to their 0 condition in anticipation of receipt of the next instruction word from cable 107.

*Operation No. 11.*—Operation No. 11 clears the data word register 205 and is identical to the above described Operation No. 5 in effect.

*Testing for opens.*—The program Operation Nos. 12–24 are representative of the testing operations effected on a network comprising interconnected pins or terminals in block 181 to determine that the network pins are interconnected. It is to be understood that while a network including only first and second pins is used in the present example, the program obviously can be extended to testing of networks including additional network pins by inserting after operation number 23 additional sets of operations similar to Operations No. 20, 21, 22, and 23 as many times as there are additional pins in the network.

*Operation No. 12.*—The first word received on cable 107 during the execution of the testing part of the program is (*WW000), which is of the instruction class. As in the case of the above described Operation No. 1, the receipt of this instruction word results in the writing of the characters in the various character registers of instruction word register 206, which therewith selects an AND circuit (232) within decoder 228 for later operation.

*Operation No. 13.*—The word received and which dictates the substance of Operation No. 13 is of the data class and identifies the first pin of the network within terminal block 181 of panel 180. As in the case of Operation No. 2, the receipt of the presently considered data word is effective to cause the characters to be written into data word register 205.

*Operation No. 14.*—Like Operation No. 3, Operation No. 14 is effected to execute a stepup instruction and causes the word written into instruction register 206 to make the AND circuit selected during Operation No. 12 within instruction decoder 228 produce an output signal. In the case of Operation No. 14, the instruction decoder circuit so enabled is 232 because the word inserted in register 206 during Operation No. 12 is of value which selects circuit 232 for operation. Upon the receipt of the previously described "set up" signal on conductor 211, AND circuit 232 is effective to produce a signal on its output conductor 232A which is used to prepare timing ring generator 249 for operation. The signal on conductor 232A also is applied via OR circuit 255A to the sampling inputs of an output gate set (such as 241B) within the various registers of data buffer 240. Consequently, the pin address data stored in buffer 240 is manifested as address signals on the conductors of cables 241A, 242A, and 243A at this time.

*Operation No. 15.*—Like the above described Operation No. 4, Operation No. 15 is dictated by a word having the first significant character which causes an "execution" signal to be produced on conductor 212 by decoder 201. The signal on conductor 212, in the presence of the above described signal on conductor 232A resulting from the execution of Operation 14 causes timing ring generator to carry out a single cycle of operations during Operation No. 16.

*Operation No. 16.*—Operation No. 16 takes place during an interrecord gap in the tape currently being read by unit 101. As a consequence of the occurrence of this gap, adapter unit 103 stops the advance of tape unit 101 unitil a start signal is supplied to adapter 103 by tester 200 in the manner to be set forth below.

From Operation No. 15 it is to be recalled that the timing generator 249 has been caused to execute a single operating cycle, so that generator 249 produces sequential signals on conductors 248, 255, 256, and 257. As the result of the application of a signal to conductor 248, output gates (such as 241D) of the various buffer 240 registers are sampled and therewith admit the data word characters stored in registers 241, 242, and 243 of data buffer 240 to the inputs of relay decoders 245 and 247. The operation of relays within decoders 245 and 247 in accordance with the data received from buffer 240 is effected by the signal produced on conductor 255 by generator 249.

At this time, it is mentioned that the data signals read from buffer 240 during Operation No. 16 represent the identity of the pin in block assembly 181 currently under consideration as well as the address of the core within memory element 260. In the case of currently considered Operation No. 16, the pin so identified is the first pin in the network currently being examined by tester 200.

The operated relays within decoders 245 and 247 establish a conductive path between conductor 251 and the one of the conductors in cable 202 which is connected to the terminal or pin in block assembly 181 specified by the data currently contained in buffer 240. During the next step of the cyclic operation of generator 249, a pulse appearing on conductor 256 drives generator 250 in order to apply a pulse to the conductor in cable 202 selected by decoders 245 and 247 and to selected pin in assembly 181 connected thereto. As a consequence of the energization of the first pin of the network in the above described manner, the other pins in the network also are energized at this time. By virtue of the connection of each pin in assembly 181 to the set winding of the one of cores in memory element 260A which corresponds and is unique to that pin, the cores in element 260A which corresponds to the first pin and to the other network pins are driven to their 1 states by the pulse produced by generator 250.

During the next step of Operation No. 16, the signal produced by generator 249 on conductor 257 is conveyed via OR circuit 270A and conductor 270 to the Start First Mode Read input of memory control element 264. Since the address data corresponding to the selected pin in assembly 181 is applied via cable 241A, 242A, and 243A to the address inputs of control element 264, the signal appearing on conductor 270 causes memory control element to read the contents of the core within element 260A which corresponds to the above-identified, first network pin in assembly 181. This reading operation of cores is destructive, i.e., an address core storing a binary "1" is restored to its "0" state during the reading operation.

If a binary 1 is read from the core addressed in this fashion, memory control element is effective to produce a signal on "Start Tape" output line 282 which indicates that the first pin in the network has been addressed correctly (i.e., the first network pin identity has been verified), so that tests on other pins in the same network may proceed. The signal on conductor 282 via OR circuit 104 and conductor 105 to the start input of tape adapter unit 103 (therewith causing unit 103 to restart tape unit 101.

In the event a binary 0 is read from the core of memory element 260A addressed in the above described manner, control element 264 is effective for producing on "Start Tape" line 282 a signal to restart unit 101 (as above) and a signal on "Transfer Open Pin" line 274 a signal (indicating failure to identify the pin addressed in the first mode read operation of memory 260) which is conveyed via OR circuit 212A to sample the input gates of word buffer A register 217A. As a consequence, the word stored in register 205 is written into the character registers of register 217B for subsequent use in directing typewriter 150.

*Operation No. 17*.—In a manner similar to that described in Operation No. 10, Operation No. 17 is carried out to clear instruction word register 206.

*Operation No. 18*.—In a manner similar to that described in Operation No. 5, Operation No. 18 is carried out to clear data word register 205.

*Operation No. 19*.—This operation is carried out during the receipt of a word (*VV000), of the instruction class, and, as in Operations 1 and 12 described above, the received instruction word characters are written into the various character registers of instruction word register 206. As a consequence of the admission of the presently considered instruction word to register 206, the signals on cables 226 and 227 are of value sufficient to select one of AND circuits (229) within instruction decoder 228 for later operation.

*Operation No. 20*.—Operation No. 20, like Operations No. 2, 6, and 13, is carried out to admit the characters of a data word appearing on the conductors of cable 107 to the various character registers of data word register 205. The operation is effected in a manner similar to that described in connection with Operation No. 2.

*Operation No. 21*.—Operation No. 21 is similar to Operation No. 3, and is carried out to make operative AND circuit 229 within decoder 228 (which has been selected for use in Operation 19). During Operation 21, the "set up" signal appears on conductor 211 and causes selected AND circuit 229 to produce a signal on its output line 244. The signal appearing on conductor 244 and applied through OR circuit 255A samples the output gates (such as 241B) of the various registers within data buffer 240. Consequently, the signals stored in buffer 240 (which represent the identity of the second pin of the network under test) are used to generate address signals on the conductors of cable 241A, 242A, and 243A. The appearance of the signal on conductor 244 also is applied through OR circuit 270A and over conductor 270 to the Start First Mode Read input of memory control element 264.

As in the case of Operation No. 16, the appearance of address signals on the conductors of cables 241A, 242A, and 243A and a start signal conductor 270 is effective to cause element 264 to read the core in memory element 260A which corresponds to the data contained in buffer 240. Since this represents the second network pin identity in the Operation No. 21 step, a "1" signal read from the core addressed during Operation No. 21 indicates a connection within terminal block 181 which is in accord with the wire list data read from tape unit 101. As in the case of Operation No. 16, the reading of a "1" signal from the addressed core causes element 264 to produce a signal on conductor 282. Again, the reading operation of the addressed core is destructive, so that a core storing a binary "1" is restored to its "0" state during the presently-considered reading operation.

Conversely, the failure of memory 260 to read from the core addressed as above during Operation No. 21 causes a signal to appear on conductor 282. As in the case of Operation No. 16, control element 264 produces signals on conductors 274. The latter signal is produced only if a like signal had not been produced during the execution of the WW instruction prior (as in Operation No. 16) because only one transfer into register 217B operation is allowable during the test of any one network.

*Operation No. 22*.—Like Operation No. 4, Operation No. 22 is carried out to execute the decoded instruction word set out into decoder 228 during Operation No. 19.

*Operation No. 23*.—Operation No. 23, like Operation No. 5, is effected upon the receipt of an instruction word having a first, action character which causes decoder 201 to produce a signal on conductor 209. The latter signal clears data word register 205 in anticipation of admitting to register 205 the next received data word on cable 107 to register 205.

*Operation No. 24*.—Operation No. 24, like Operation No. 10, is effected upon the receipt of an instruction word having a first, action character which causes decoder 201 to produce an output signal on conductor 210. The latter clears instruction word register 206 in anticipation of admitting the next-received instruction word on cable 107.

*Testing for shorts to non-network terminals*.—Operation Nos. 25–30 are carried out to determine the presence of any residual binary 1's stored in memory element 260A after the completion of destructive read out of all cores which correspond to network terminals of panel 181. Since all cores of memory element 260A are cleared prior to the outset of Operation No. 1, and any binary "1's" written into the cores during testing Operation Nos. 1–24 to terminal networks should have been destructively read out while theose steps were being performed, it follows that any core storing a binary "1" at the conclusion of Operation No. 24 represents the terminal or pin in assembly 181 which is erroneously connected to the currently considered network. To detect the presence of stored binary "1's" after performing Operation Nos. 1–24, all cores in memory element 260A are read in sequence (scanned) during the next described Operation Nos. 25–29. Since this reading of cores also is destructive, the cores of memory element 260A all are in "0" state at the conclusion of the current network test, and ready to store an image of the next-examined network.

*Operation No. 25*.—The word appearing on cable 107 at the outset of Operation No. 25 (*UU000) is of the instruction class. As in the case of instruction words used in Operation Nos. 1, 12, and 19, the characters of the presently considered instruction word are admitted to the appropriate registers of instruction word register 206. The output bits appearing on the conductors of cables 226 and 227 at this time select AND circuit 231 within instruction decoder 228 for later operation.

*Operation No. 26*.—Operation No. 26, like Operation Nos. 2, 13, and 20, is carried out to admit from cable 107 the characters of the word next appearing on cable 107 to data word register 205. The presently considered word represents the identity of the network presently being examined. Since the present scan is to be made of all memory cores, the starting address is the first core in all memory planes (address 0000).

*Operation No. 27.*—Like Operation No. 3, Operation No. 27 is carried out upon receipt of an instruction word from cable 207 which causes decoder 201 to generate "set up" signal on conductor 211. The latter signal causes AND circuit 231 (selected for use during Operation No. 25) of decoder 228 to produce a signal on its output conductor 279.

*Operation No. 28.*—The first character of the next-received word on cable 107 causes decoder 201 to produce an "execute" signal on conductor 212. The receipt of the latter signal marks the start of Operation No. 29, during which the scanning process is carried out.

*Operation No. 29.*—The conductor 279 signal generated in Operation No. 27 is applied to the Start Second Mode Read input 279 of control element 264. Consequently, element 264 carries out a scanning operation starting at the first address of each core plane and proceeding systematically through all addresses of element 260A. This scanning operation (parallel reading of corresponding cores in all planes) is maintained under the control of signals generated within element 264.

An interrecord gap on the tape currently used by unit 101 and occurring after Operation No. 28 is complete allows adapter unit 103 to stop the advance of tape unit 101. Accordingly, units 101 and 103 are quiescent until a start signal is supplied thereto to unit 103 from tester 200 in the manner described below.

As the scan operation proceeds, a "0" read from a core currently addressed by element 264 allows element 264 to address the next core and repeat the reading operation. Assuming that no stored "1" signal is read from an address within element 260A, the scan operation proceeds until the last address of memory element 260A has been read. At this point, element 264 is effective to produce on output conductor 282 a signal which is conveyed to the start input of adapter unit 103 because no short or open pin condition has been detected. Consequently, adapter unit 103 restarts tape unit 101 which will thereupon read the next recorded word of the tape contained therein. It is pointed out that this next word may be the start of another series of network test words (record) to be used in the test of another network (and therefore similar to those described in connection with Operation Nos. 10–29) or the next word may represent an end-of-file symbol signaling the end of test of currently considered panel 181.

If, during the scan of memory element 260A, a binary "1" is read from the currently addressed core in element 260A, control element 264 is effective to produce a "transfer" signal on conductor 285. The latter signal read out over the conductors of cables 287 the identity of the currently addressed core producing such a signal. The conductor 285 signal samples the input of word buffer B via OR circuit 285A. Consequently, the identity signals appearing on cable 287 are admitted to the character registers of word buffer B register 218. An end-of-test signal generated at the end of the scan cycle in 264 is effective to start the typewriter print out (if an open or short error has ben detected) via line 281 to OR circuit 151. If no error has been detected, a signal is transmitted via line 282 to restart the tape. Should the typewriter be started the signal to restart tape is obtained over line 153A.

*Operation No. 30.*—The end-of-file (conclusion of testing) for panel 180 is marked by the word received over cable 107 during Operation No. 30. This word (000000) causes decorder 201 to produce a signal on conductor 216, which is passed by now conditioned AND circuit 215A to conductor 109 and thence to tape adapter unit 103. Unit 103 responds to the latter signal by causing selected tape unit 101 to rewind an anticipation of the next panel test to be performed employing the tape currently loaded into unit 101.

*Component and circuit descriptions*

The following section describes certain circuits and groups of circuits employed in the above described tester and signal generator. It is to be realized that while the circuits described below may be used in the preferred embodiment of the present invention, each is only representative of a class of circuits suited for incorporation in the inventive combination.

Figure 3:
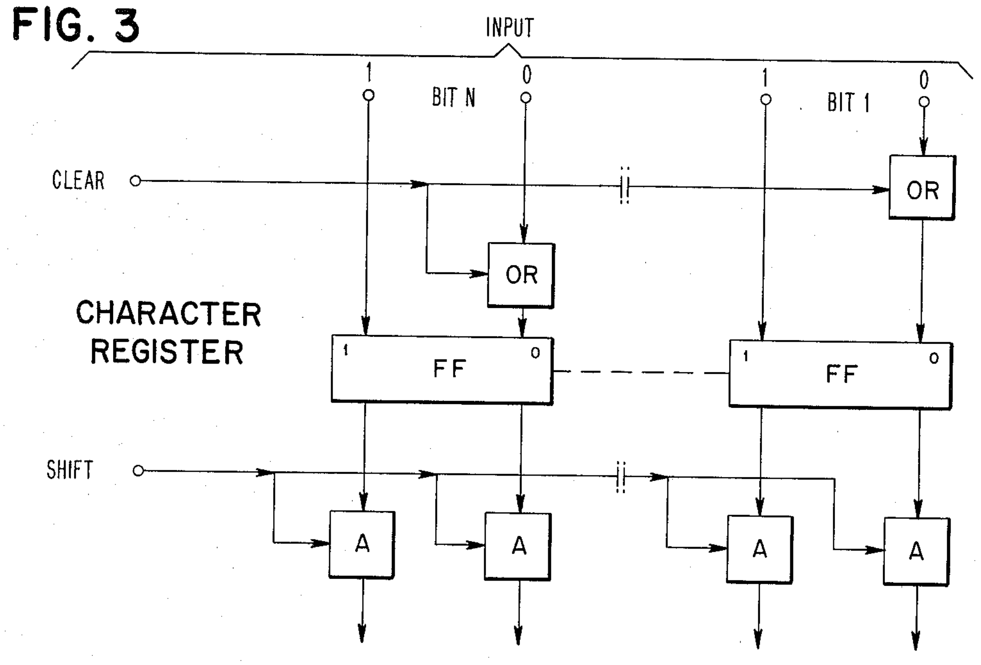
FIG. 3 is a schematic diagram of a representative character register.

*Character register.*—Referring to FIG. 3, a typical character register is shown. A plurality of storage flip-flops have inputs disposed in regular order to receive bit signals 1 through N of a character. Such signals have been transmitted in the so-called double line transfer mode and are effective to set the flip-flops in 0 or 1 condition in accordance with the signal values. The 1 bits of the incoming character are applied directly to the 1 inputs of the flip-flops, while the 0 bits are applied to the flip-flop 0 inputs via OR circuits individual to the various flip-flops. A signal to the "clear" input of the character register also may be applied to inputs of the flip-flops via the above mentioned OR circuits. After the bits of any character have been written into the various flip-flops, a signal applied to the shift input is effective to sample the conditions of the flip-flops at a series of output AND circuits, which have been conditioned by the 0 and 1 outputs of the various flip-flops. The signals resulting at the outputs of the AND circuits may be employed as required.

Figure 4:
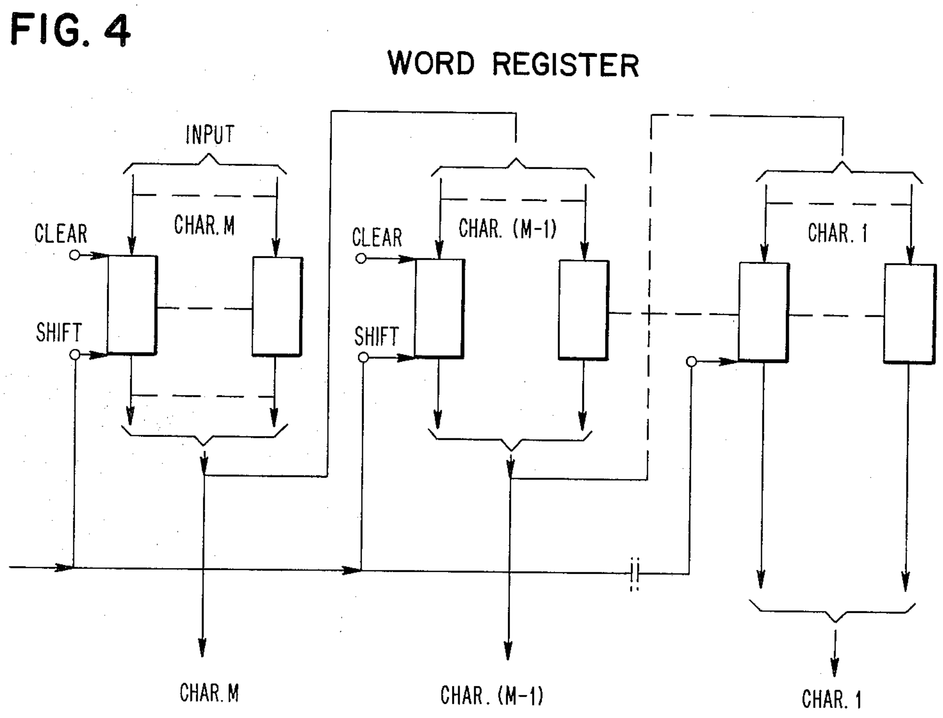
FIG. 4 is a schematic diagram of a representative word register.

*Word register.*—Referring to FIG. 4, a word register comprising a plurality of the previously described character registers is shown. The various character registers are arrayed in order such that a character transmitted to the register is written into the flip-flops of the high order M character register. Upon the registration of the bits of a character in the high order character register, a signal applied to the parallel-connected shift inputs of all character registers is effective to shift the bits of the character parallel from the flip-flops of the high order character register into the flip-flops of the next lower order character register, and to carry out similar operations with respect to all lower order character registers. Upon the receipt of the shift signal, the outputs of the flip-flops in each of the various character registers also are applied to output conductors. The application of a signal to the clear input of the various character registers is effective in the previously described manner to reset the flip-flops of all character registers to 0 state.

Figure 5A:
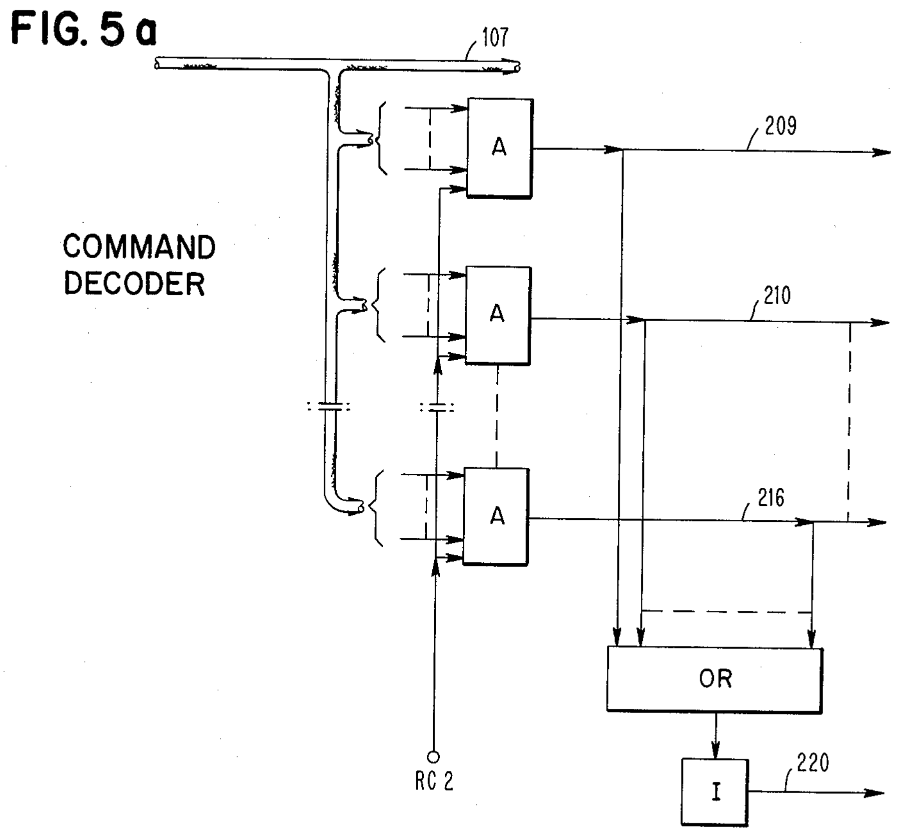
FIG. 5A is a schematic diagram of a representative command decoder.

*Command decoder.*—Referring to FIG. 5A, the various AND circuits which are included in the command decoder have conditioning inputs connected to the conductors of a cable, such as 107. Upon the appearance of a signal on each of the conductors of cable 107 which is uniquely connected to a particular AND circuit and upon the application of a sampling pulse signal to an input, such as RC2, which in turn is coupled to the remaining input of each of the above described AND circuits, the circuit so energized is effective to produce a signal on its output conductor.

A signal appearing on any one of the AND circuit output conductors is passed through an output OR circuit and applied to an inverter which has an output conductor 220. With this configuration, appearance of a signal on any output conductors 209–216 of the AND circuits causes the inverter to remove a significant signal from its output conductor 220. Conversely, the failure of any AND circuit to produce a significant signal causes the inverter to produce a significant signal on output conductor 220.

Figure 5B:
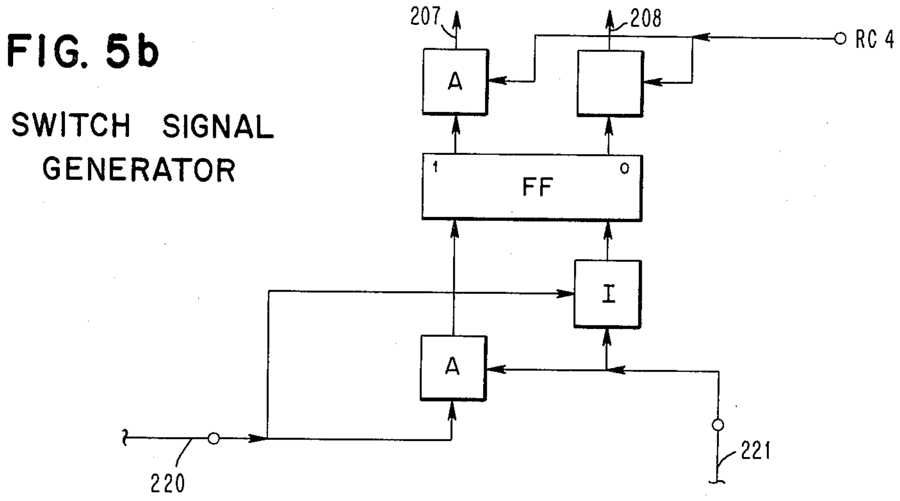
FIG. 5B is a schematic diagram of a representative switch signal generator.

*Switch signal generator.*—Referring to FIG. 5B, there is shown a generator for producing an output signal on either of its output conductors 207 and 208 in accordance with input signals applied to its input conductors 220 and 221. Upon the appearance of a signal on conductor 221, the signal is applied through a normally-conditioned inverter circuit to the 0 input of a flip-flop, therewith placing the flip-flop to 0 state. In the presence of a signal on both input conductors 220 and 221, the above mentioned inverter circuit is deconditioned, and the AND circuit having inputs connected to both conductors 220 and 221 is made operative to apply a signal to the 1 input of the aforementioned flip-flop. The outputs of the flip-flops are connected to conditioning inputs of AND circuits, the condition of which is sampled by still another signal, such as RC4. The conditioned and sampled one of the output AND circuits produces a signal on the appropriate one of output conductors 207 and 208.

Figure 6:
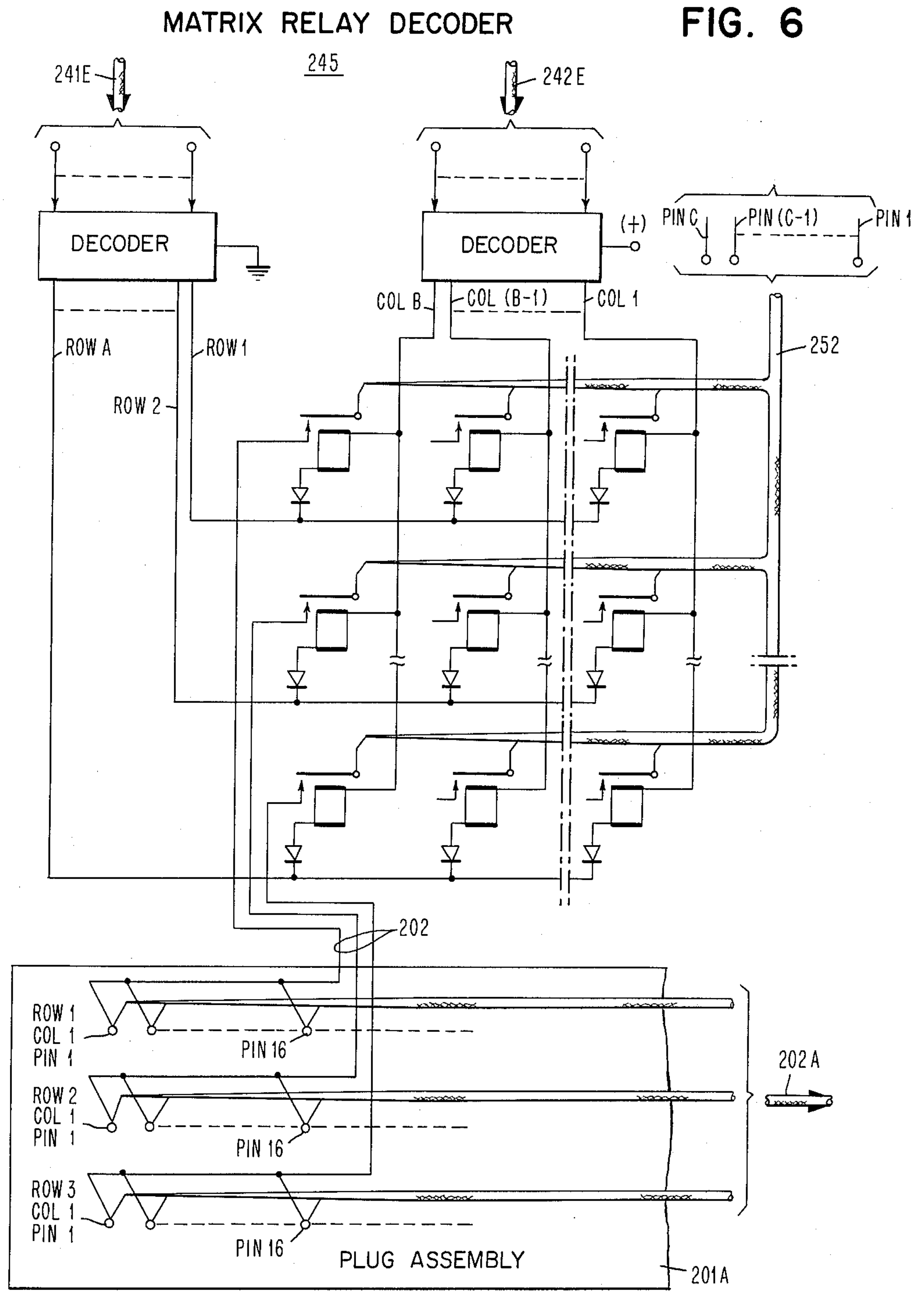
FIG. 6 is a schematic diagram of a representative matrix type relay decoder and a suitable plug assembly for use therewith.

*Matrix relay decoder.*—Referring to FIG. 6, there is shown matrix decoder 245 in which the conductors of cables 241E and 242E are connected to the inputs of first and second diode-type decoders. Each decoder is effective in response to the application of a set of signals to its input to energize one and only one of its output conductors, the conductor being selected in accordance with the unique combination of signals present at the decoder input. The decoder driven from cable 241E is effective to produce ground level signal, while the signal produced by the other decoder is positive with respect to ground.

Decoder 245 also includes a plurality of electrical-mechanical relays disposed in a row and column matrix. Each of outputs of the decoder driven from cable 241E is connected to one side of the energizing windings of the relays disposed in each of the various matrix rows, while each of the outputs of the decoder driven by the conductors of cable 242E is connected to the other side of each relay energizing winding disposed in each of the various matrix columns. An isolating diode individual to and connected in series with each relay energizing winding prevents backups (spurious operating circuits within the matrix). With the above described configuration, the production of significant signals at the output of both decoders causes the relay unique to the intersection of the row and column lines energized by the decoders to be operated.

Each of the above described relays is a multi-contact device and is effective for connecting each of the conductors in input cable 252 to a corresponding one of a set of output conductors individual to that relay. The latter output conductors are included in a cable shown as 202, so that a signal applied to one of the cable 252 conductors is conveyed through the contacts of an operated matrix relay and a conductor of cable 202 to an individual plug in assembly 201A. The plugs in the latter assembly also are connected individually to conductors in the cable shown as 202A. Thus, a significant signal appearing at any of the plugs in assembly 201A is applied to an appropriate conductor within cable 202A.

Figure 7:
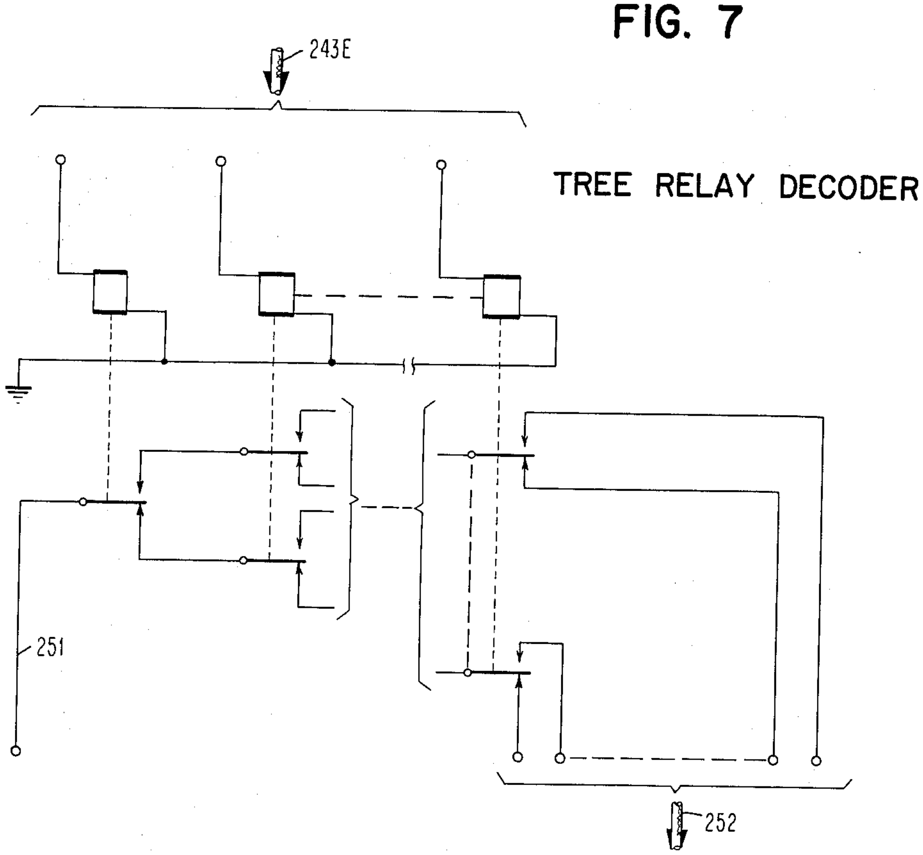
FIG. 7 is a schematic diagram of a representative tree type relay decoder.

*Tree relay decoder.*—Referring to FIG. 7, there is shown a plurality of relays, each relay having one side of its energizing winding connected to an individual one of the conductors of cable 243E. The other side of each relay energizing winding is connected to a common ground return path. Upon appearance of signals on a particular combination of conductors within cable 243E, a corresponding combination of the above mentioned relays are operated.

Each of the above described relays includes one or more sets of transfer contacts disposed in a well-known tree configuration, so that the relays in any operated combination are effective to complete a path from input conductor 251 to a particular one of output conductors included in cable 252. In this manner the signal applied to conductor 251 subsequent to the operation of any combination of relays is transmitted to the one of the output conductors in cable 252 unique to the particular combination of operated relays.

Figures 9, 10:
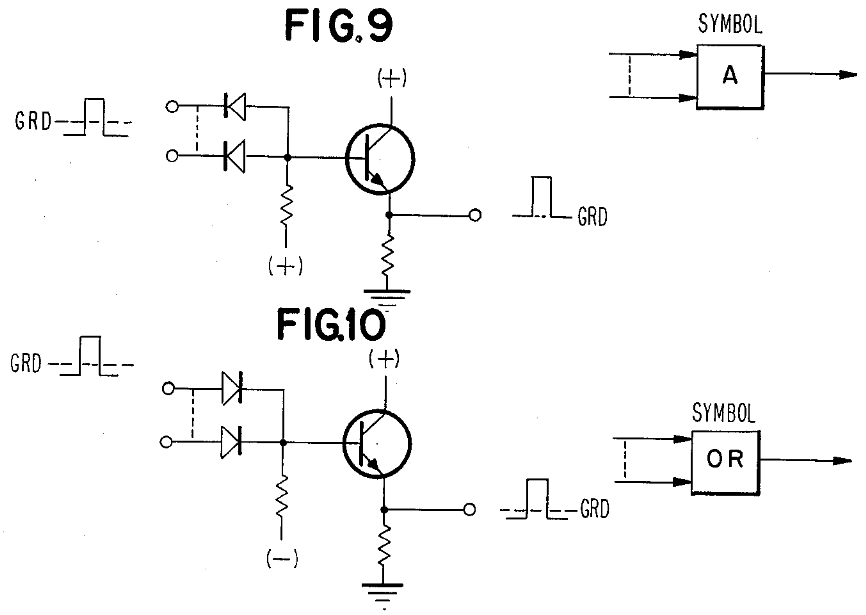
FIG. 9 is a schematic diagram of a representative AND circuit.
FIG. 10 is a schematic of a representative OR circuit.

*AND circuit.*—Referring to FIG. 9, there is shown an AND circuit having plurality of inputs. Each input is diode-coupled to the base of a transistor. The diodes normally are conductive and maintain the base of an NPN type slightly negative with respect to its emitter. Consequently the transistor's emitter normally is maintained near ground level. When signals have been applied to all circuit inputs to back-bias the input diodes, the transistor base becomes more positive with respect to its emitter, allowing the emitter voltage (which forms the circuit output) to rise to a level above ground potential. This AND circuit may be used either as a pulse or level responsive device.

*OR circuit.*—Referring to FIG. 10, there is shown a circuit having a plurality of inputs, each coupled by a diode to the base of an NPN type output transistor. The diodes normally are biased to the nonconducting state, so that the base of the output transistor is maintained at a level which causes the output transistor to conduct only slightly between its emitter and collector. Upon the application of a signal to any one of the input conductors, the corresponding input diode becomes forward-biased and raises voltage on the base with respect to the emitter in order to allow more current to flow between emitter and collector. Consequently, the voltage at the emitter (which forms the circuit output) rises at this time. This particular OR circuit may be used as a pulse or level responsive device.

Figure 11:
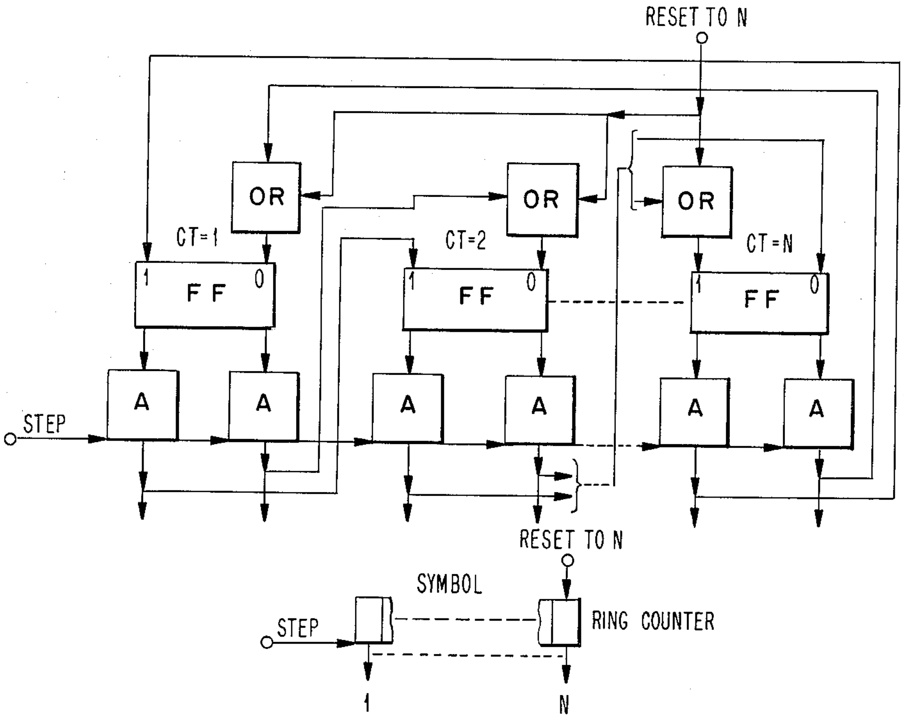
FIG. 11 is a schematic diagram of a representative ring counter.

*Ring counter.*—Referring to FIG. 11, there is shown a double line transfer type ring counter in which are included a plurality of flip-flops. One of the flip-flops is assumed to be set to its 1 state and all other flip-flops are assumed to be set in 0 state. The 0 and 1 outputs of each flip-flop are connected to the conditioning inputs of AND circuits. The AND circuits of all flip-flops are sampled in parallel by a signal applied to the step input. At this time, the conditioned AND circuit of each flip-flop produces a signal which is applied to the 0 or 1 input, as appropriate of the next lower order flip-flop in all stages except the last. In the case of the last stage, the output of each AND circuit is connected to the appropriate input of the first stage flip-flop. Signals appearing at outputs of the above described AND circuits of each stage are connected to output conductors for the counter. The counter can be reset to a count=N condition by applying a signal to the Reset to N input. The latter signal is passed by OR circuits individual to each flip-flop to the 0 input of all flip-flops except the flip-flop of stage N, where the resetting signal is applied to the flip-flop's 1 input.

*Memory 260.*—The next following description is directed chiefly to the operation of control element 264. While memory 260 includes memory element 260A, the construction and operation of the latter is conventional. Element 260A is adapted to respond in a manner well understood to signals generated within control element 264 to produce signals employed within tester 200. On the other hand, memory control element 264 has certain special features not found in a conventional control element which are brought out in the description which next follows. Accordingly, an organization of a memory control element suited to use with the above described tester 200 is next described. In the present description, reference is made to FIGS. 12A, 12B, and 12C.

*Starting memory 260.*—A start signal received over either of conductors 270 and 279 is conveyed via OR circuit 301 to the 1 input of flip-flop 302 within time pulse distributor 300. Flip-flop 302 therewith is set to its 1 state and conditions AND circuit 302A. Consequently, circuit 302A is made effective at this time to pass clock pulses from continuously running clock 304 to the stepping input of ring counter 303. Counter 303 is advanced through a single cycle of operations (in the case where the start signal is incoming over conductor 270) or a series of cycles (where the start signal is incoming over conductor 279). In either event, each single cyclical operation of counter 303 is effective to produce on the counter outputs a series of successive timing pulse signals numbered TP0–TP11. The remainder of the apparatus in control element 264 functions upon the receipt of these timing pulses.

Counter 303 may be stopped by resetting flip-flop 302 to its 0 state in the manners explained presently. Restoring flip-flop 302 to 0 state deconditions AND circuit 302A, so that circuit 302 blocks the admission of further clock 304 pulses to the stepping input of counter 303.

*First mode reading operation.*—It is to be recalled from the description of tester 200 that upon the application of a signal to conductor 270, element 264 produces signals which read only the core in element 260A currently identified by signals present on the conductors of cables 241A, 242A, and 243A. It is further to be recalled that control element 264 evaluates signals received from memory elements 260A and produces outputs appropriate to the received signal and to the mode in which memory 260 is being operated. Accordingly, memory 260 is driven through a single read-write cycle of operations in the manner next set forth.

Upon the starting of time pulse distributor 300 in the above described manner, the BCD-encoded signals on the conductors of cables 241A and 242A pass through various OR circuits of message address register 305 to the inputs of decoders 306 and 307. As a consequence of the decoding action within 306 and 307, one and only one output conductor of each decoder bears a signal. The signals produced by decoders 306 and 307 are applied to the appropriate inputs of load share switches 308 and 309. Switches 308 and 309 are made effective by drivers 310 and 311 (associated with switch 308) and drivers 312 and 313 (associated with switch 309) upon the occurrence of timing pulses TP1, TP2, and TP3 to produce coincident, bipolar output pulses on appropriate ones of the X and Y drive lines contained in cables 277. As a consequence, the addressed cores in each plane of memory elements 260A are driven through successive read and write halves of a single memory cycle. During the first-occurring read half of the cycle, any address core storing a binary 1 signal produces a signal on the sense line of the plane. Such sensed 1 signals are delivered to element 264 over the conductors contained in cable 276.

Since the addressed cores in the various planes all are destructively read (i.e., left in 0 state) at the conclusion of the read half of the cycle, it is necessary to rewrite signals received from the cores disposed in planes not identified by the address signals incoming to elements 264 in the cores from which signals have just been read during the write half of the memory cycle. To this end, the signals present on the conductors of cable 241A (which define the address plane in memory element 260A) are applied to the inputs of decoder 309. Decoder 309, like decoders 306 and 307, is arranged to produce a signal on only one of its output conductors in response to a set input signals. The signal-bearing one of decoder 309 output conductors identifies core plane in which the rewriting operation is to be inhibited (i.e., the plane containing the core in which a sensed 1 signal is not to be rewritten). To this end, the signal from decoder 309 is applied via the appropriate one of OR circuits 340 to one of a first set of inputs of AND gate 314. The sampling of the AND circuits in gate 314 and the use of a signal produced by the gate are described below.

The binary 1 signals delivered over cable 276 to control element 264 are passed through sense amplifiers, such as 315 and 316 and are used to set appropriate ones of flip-flops, such as 317 and 318 within register 319 to their 1 states. The output from these flip-flops are applied to appropriate ones of a second set of inputs of the above mentioned AND gate 314. Consequently, that one of the AND circuits within gate 314 which has been conditioned by the output of decoder 309 produces a signal which is passed via the appropriate one of OR circuits 360 and a conductor of cable 278 through the inhibit windings cores of the plane in which the rewriting of a one signal is to be prevented. During the write half of the memory cycle, other, conventional apparatus (not shown) is used to write 1 signals in all addressed cores in the various planes from which a 1 signal has been read except for the core within the plane in which the inhibit conductor of which bears a signal (applied as described above).

It is to be recalled from the description of tester 200 that the reading of a 1 signal from the addressed core during first mode readout operation of memory 260 is indication of a successful (acceptable) testing, and, as a consequence, that an output signal is to be produced on conductor 282. To this end, a first set of AND circuits 319 and 320 within logical element 341 (which have been conditioned by the signal present on conductor 270) are prepared to receive via OR circuit 321 and AND circuit 329 (which is sampled by pulses TP5, TP6, TP7, and TP8) the signal produced in the above described manner at an output gate of 314. Such a signal, passed circuits 321, 329, and 319, is used to set flip-flop 342 to its 1 state. The resulting signal produced at the 1 output of flip-flop 342 is passed via OR circuit 346, AND circuit 347 (which has been conditioned by the conductor 270 signal) and OR circuit 348 to output conductor 282.

In the converse situation (where a 0 has been read from the addressed core of the plane in element 260A identified by the cable 241 signals) the absence of a significant signal on any one of the gate 314 outputs is inverted at circuit 322. As a result, the significant signal produced in this case by circuit 322 is passed by now conditioned AND circuit 320 to set flip-flop 343 in its 1 state. The resulting signal produced at the 1 output of flip-flop 343 is applied to output conductor 274.

The end of the single cycle operation of memory 260 is signaled by the setting of either flip-flop 342 or 343. Accordingly, the signal produced at the 1 output of either flip-flop is passed via OR circuits 349 and 350 to the 0 input of time pulse distributor flip-flop 302, with the previously noted effect.

*Second mode read operation.*—From the previous description of tester 200, it is to be recalled that in the second mode read operation the cores of like address in all planes of element 260A are to be systematically and destructively read until the contents of all cores have been examined. This reading process is achieved by reading in parallel the cores addressed by decoders 306 and 307, starting with the low order core in each plane and progressing from core to core until all cores have been read. To this end, the signal received over input conductor 279 starts distributor 300 in the previously described manner, and conditions AND circuit 390 to pass succeeding TP9 pulses to the add-one input of counter 325. Since the overflow carry conductor 325 is connected to the add-one input of counter 326, it is to be seen succeeding TP9 pulses applied to the input of counter 325 cause the count within 325 and 326 to be increased by one for each cyclical operation of distributor 309. Consequently, the succession of sets of signals produced on the outputs of counters 325 and 326 are used to represent successive plane addresses of cores within element 260A. The latter address signals are passed via OR circuits within register 305 to the inputs of decoders 306 and 307, allowing decoders 306 and 307 in combination with switches 308 and 309 to translate each such set of address signals into sets of coincident X and Y drive pulses. As in the case of first mode read operation, each set of X and Y signals is effective during the read half of the cycle memory to cause a stored 1 signal to be destroyed and a 0 expressed within the appropriate flip-flop of register 319.

From the description of tester 200, it is to be recalled that the reading of a 1 signal from the cores addressed during the second mode read operation indicates a failure of the circuit under test, and that any such one signal is to be destroyed in order to clear memory element 260A for subsequent use. To prevent such 1 signals from being rewritten during the write half of the memory cycle, the signal present on input conductor 279 is passed by all OR circuits 360 to apply signals to all inhibit conductors within cable 278 with the previously noted effects.

AND circuits within gate 370 are conditioned by the presence of the signal on conductor 279. Consequently, signals appearing at any output of register 319 is passed by gate 370 and OR circuit 371 to condition sets of output AND circuits connected to the outputs of counters 325 and 326 within message address register 355. As a result, the core plane address signals currently generated in message address register 305 are passed by these register 305 AND circuits to set decoders 372 and 373.

Any signal produced at an output of register 319 also is passed through the appropriate AND circuit of gate 314 (all such AND circuits having been conditioned by the signal presented on conductor 279 and applied via OR circuits 340 to the conditioning inputs of gate 314). Any signal produced on the outputs of gate 314 is passed via OR circuit 321 and AND circuit 329 (sampled in the previously described manner) to an AND circuit 350 (which now is conditioned by the presence of the signal on conductor 279). A signal produced in this manner at the output of AND circuit 350 sets flip-flop 345 to its 1 state. The resulting signal produced at the 1 output of flip-flop 345 is applied to output conductor 285.

In order to complete the generation of core address signals (already partially generated by decoders 372 and 373) for transmission over the conductors of cable 287 in the manner described in connection with tester 200, it is only necessary at this point to encode the identity of the planes in element 260A containing the core which has produced a 1 signal. To this end, the signal produced at the 1 output of flip-flop 345 is applied to the conditioning input of AND circuit 374, which thereupon passes scan pulses to the stepping input of ring conductor 373. The signals serially occurring on the outputs of counter 373 sequentially sample the AND circuits of gate 372, which at this time may be conditioned by signals present on the 1 outputs of flip-flops within register 219. The application of an output signal by gate 372 to the input of decoder 375 sets the decoder to produce a set of BCD-encoded signals which, with other BCD encoded signals from decoders 372 and 373 are conveyed to typewriter 150 over the conductors of cable 287.

The conclusion of second mode read operations is marked by the advance of counters 325 and 326 to the point where all plane addresses for use within memory element 260A have been generated. At this point, the combination of output signals produced by counters 325 and 326 is such that AND circuit 376, which has inputs coupled to the counter outputs, is effective to produce a signal at its output with the presently-noted effects.

The AND circuit 376 output signal is effective to stop the cyclical operation of time pulse distributor 300. The operation is effected by passing the AND circuit 376 output signal through OR circuit 350 to the 0 input of flip-flop 302 with the previously noted effect.

The signal produced by AND circuit 376 also is used to test the condition of logical element 341 and to produce (a) a signal on output conductor 282 in the event that no signal indicating the storage of a 1 in element 260A has been sensed during the second mode read operation; or (b) conversely, to produce a signal on conductor 281 in the event that such a signal has been sensed during the second mode read operation or in the event that flip-flop 343 has been set to its 1 state during the first mode read operation. To this end, the signal generated in the previously described manner by flip-flop 345 as a result of a detected error indicating 1 signal stored in memory element 260A is applied to the conditioning input of AND circuit 378. Consequently, the above described signal on the output of AND circuit 376 which is applied to the sampling input of circuit 378, is passed via OR circuit 379 to conductor 281. The appearance of the output signal produced by circuit 376 also is effective to sample the condition of AND circuit 377 which is conditioned by the 1 output of flip-flop 343. In the event flip-flop 343 is in its 1 state and circuit 377 conditioned, the signal appearing on the output of AND circuit 376 is passed via OR circuit 379 to conductor 281.

In the converse situation, where neither flip-flop 343 or 345 has been set to its 1 state and circuits 378 and 377 are not conditioned, the outputs of the latter circuits are inverted at circuit 381, and the resulting significant signal produced by circuit 301 is applied to the conditioning input of AND circuit 380. Circuit 380 also is sampled by the output signal from circuit 376, with the result that a signal produced by circuit 380 under these conditions is applied via OR circuit 348 to output conductor 282.

While the invention has been particularly shown and described with reference to a preferred embodiment thereof, it will be understood by those skilled in the art that the forsegoing and other changes in form and details may be made therein without departing from the spirit and scope of the invention.

What is claimed is:

1. In a system for testing the continuity or discontinuity of electrical connections in apparatus, where said apparatus includes a number of points which have been electrically interconnected to each other to form a network in accordance with a connection plan, the combination comprising:

a memory having a plurality of elements, each of said elements being operative to store a signal which has been written therein, and thereafter operative to read out a signal stored therein, each of said apparatus points corresponding and being unique to one of said elements, energizing means selectively operable to apply a signal to one of said network apparatus points and therewith to any other of said points connected thereto, means operable to write in parallel signals appearing at said apparatus points into the corresponding elements of said memory, said elements storing signals forming an image in said memory of those apparatus points which are connected to the one of said points selected by said energizing means, means for producing signals corresponding to addresses of said memory elements which define said network connections with respect to the energized said apparatus point, and control means operable in a first mode after the operation of said writing means to serially read elements at addresses in said memory as indicated by said signal producing means, and means operative upon the detection by said control means of an addressed one of said elements not storing a signal to preserve the identity of the said apparatus point corresponding thereto.

2. The system set forth in claim 1 wherein said control means is operable in first mode to destructively read signals stored in each of said addressed memory elements, and said control means also includes means operable in scanning mode after the first mode operation of said control means is complete to read all said memory elements, and wherein said system also includes means operative upon the reading by said control means during scanning mode operation of one of said elements storing a signal to preserve the identity of the one of said apparatus points corresponding thereto.

3. In a system for testing the continuity or discontinuity of electrical connection in apparatus, where said apparatus includes a number of points which have been divided into groups, and where said points within each of said groups have been interconnected to each other to form a network in accordance with a connection plan, the combination comprising:

a memory having a plurality of elements, each of said elements being operative to store a signal which has been written therein, each of said apparatus points corresponding and being unique to one of said elements, program means operative to supply successive records of signals representing addresses of said memory elements corresponding to the intended connection plan, where the first address in each of said records represents the identity of a first of said points in a particular one of said networks and the corresponding one of said memory elements as defined by said connection plan, the succeeding addresses in the same one of said records represent the addresses of other of said points in the same one of said networks and corresponding ones of said memory elements as defined by said connection plan, energizing means operable in response to address signals received thereat to apply a signal to one of said apparatus points selected in accordance with the value of the received signal and accordingly effective to apply a signal to any other of said points connected thereto, buffering means operative to apply the first address in each of said records to said energizing means and to supply all of said addresses in each of said records to said memory, means operable to write a signal appearing at any one of said apparatus points into the corresponding one of said elements of said memory, those of said elements storing signals forming an image in said memory of those of said apparatus points of the one of said networks to the one of said points currently selected by said energizing means, and control means within said memory operable in response to address signals received from said buffering means to read those of said elements identified by address signals received from said buffering means, and logical means operative in response to signals read from addressed memory elements for noting a difference between said memory elements included in said image by the operation of said writing means and said memory elements included in an image of such elments examined by said control means.

4. The system set forth in claim 3 wherein:

said control means includes first apparatus operative in a first mode to read destructively those of said elements identified by address signals received from said buffer means and second apparatus subsequently operative in a second mode to scan and destructively read all of said memory elements, and said logical means is operative in response to signals generated during both the first and second mode read operations of said control means for noting a difference between the identities of said elements corresponding to apparatus points included in a network currently under examination and addresses identifying such network points currently supplied by said buffering means.

5. The system set forth in claim 4 and having in addition:

first and second storage registers coupled to said buffering means and to said memory, respectively, said first storage register being operable in response to difference-indicating signals generated by said logical means for receiving from said buffering means and storing address signals representing the identity of one of said apparatus points at which a difference has been detected between said memory element image and elements addressed by said buffering means during the first mode read operation of said control means, means operative upon the generation of a difference-indicating signal by said logical means during the second mode reading operation of said control means for generating address signals representing the identity of the one of said points in said apparatus corresponding to the one of said memory elements at which a scan reading operation is currently effected, said second register being operative in response to a signal generated by said logical means to receive from and store address signals generated within said memory.

6. The system set forth in claim 5 and having in addition:

means responsive to address signals received from said first and second registers for printing out the addresses of apparatus points represented by addresses stored therein, said logical means also including means operative after the second mode operation of said control means has been completed for transferring addresses stored in said registers to said printing means and for making said printing means operable.

7. A method for testing the continuity and discontinuity of electrical apparatus, where said apparatus includes a number of points, certain of which have been interconnected to each other to form a network, and where there is provided a memory having storage elements, each of said apparatus points corresponding and being unique to a particular one of said elements; comprising the steps of:

applying a signal to a selected one of said apparatus points included in said network and accordingly applying a signal to all other of said points connected thereto, writing in parallel signals appearing on said points into corresponding ones of said memory elements and therewith forming in said memory an image of those of said apparatus points on which signals appear, destructively reading in a first mode those of said memory elements corresponding to points in said network as defined by said connection plan, thereafter reading each of said memory elements in a scanning operation and storing the identity of any of said points corresponding to one of said elements from which a stored signal has not been read during said first mode reading step and the identity of any of said points corresponding to one of said elments from which a stored signal has been read during said scanning read operation step.

8. The method set forth in claim 7 wherein:

said scanning reading step is destructive with respect to signals stored in said memory elements, whereby said memory is cleared of all stored signals at the conclusion of the scanning read operation.

9. A method for testing the sufficiency of electrical apparatus, where said apparatus includes a number of points which have been divided into groups in accordance with a connection plan and in which at least some of said points in each of said groups have been interconnected to each other, and where there are provided, a memory having a plurality of storage elements, each of said points being unique and corresponding to one of said elements, as well as means for generating sequential records, each of said records being unique to a particular one of said networks and including sets of addresses defining said apparatus points included therein, the steps comprising:

applying a signal to one of said apparatus points selected in accordance with the first of said addresses in each of said records and accordingly applying a signal to any other of said points connected thereto, writing in parallel signals appearing on said points into the ones of said memory elements unique thereto and therewith forming in said memory an image of those of said points included in the one of said networks containing the currently selected one of said points, destructively reading in a first mode those of said memory elements corresponding to said apparatus points defined by the currently generated set of addresses, thereafter destructively reading each of said memory elements in a scanning operation, and storing the address of any of said points corresponding to one of said elements from which a signal has not been read during said first mode reading step and the address of any of said points corresponding to one of said elements from which a stored signal has been read during said scanning read step.

References Cited by the Examiner

UNITED STATES PATENTS

| | | | |
|---|---|---|---|
| 2,950,437 | 8/1960 | Stahl | 324—73 |
| 2,963,652 | 12/1960 | Taylor et al. | 324—73 X |
| 2,973,508 | 2/1961 | Chadurjian | 340—174 |
| 3,000,003 | 9/1961 | Einsel | 340—172.5 |

OTHER REFERENCES

Electronic Design (Automatic Functional Tester) June 15, 1956 pp. 46–47.

WALTER L. CARLSON, *Primary Examiner.*

E. L. STOLARUN, *Assistant Examiner.*